(12) United States Patent
Jia et al.

(10) Patent No.: US 12,418,367 B2
(45) Date of Patent: Sep. 16, 2025

(54) HARQ INFORMATION TRANSMISSION METHOD AND APPARATUS

(71) Applicant: HUAWEI TECHNOLOGIES CO., LTD., Shenzhen (CN)

(72) Inventors: Qiong Jia, Shanghai (CN); Jiayin Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 17/955,798

(22) Filed: Sep. 29, 2022

(65) Prior Publication Data

US 2023/0014182 A1    Jan. 19, 2023

Related U.S. Application Data

(63) Continuation of application No. PCT/CN2021/086024, filed on Apr. 8, 2021.

(30) Foreign Application Priority Data

Apr. 10, 2020    (CN) .......................... 202010281527.1

(51) Int. Cl.
 *H04L 1/1829* (2023.01)
 *H04W 72/044* (2023.01)

(52) U.S. Cl.
 CPC ......... *H04L 1/1854* (2013.01); *H04W 72/044* (2013.01)

(58) Field of Classification Search
 CPC ... H04L 1/1854; H04L 1/1614; H04L 1/1861; H04L 1/1864; H04L 1/1896;
 (Continued)

(56) References Cited

U.S. PATENT DOCUMENTS

2020/0053766 A1*  2/2020  Chien .................... H04L 5/0053
2020/0351955 A1* 11/2020  Jeon ....................... H04W 76/27
(Continued)

FOREIGN PATENT DOCUMENTS

CN    107295663 A    10/2017
CN    109496398 A     3/2019
(Continued)

OTHER PUBLICATIONS

Qualcomm Incorporated, "Enhancements to Scheduling and HARQ operation for NR-U", 3GPP TSG RAN WG1 Meeting #94, R1-1809481, Gothenburg, Sweden, Aug. 20-Aug. 24, 2018, XP051516843, 7 pages.
(Continued)

*Primary Examiner* — Mohamed A Kamara
(74) *Attorney, Agent, or Firm* — Maier & Maier, PLLC

(57) ABSTRACT

A HARQ information transmission method and apparatus, to resolve a problem that HARQ information is not fed back in a timely manner. When a first device cannot successfully send first hybrid automatic repeat request (HARQ) information on a first time-frequency resource, or a second device cannot successfully receive the first HARQ information on the first time-frequency resource, the first device retransmits the first HARQ information on a second time-frequency resource for transmitting second HARQ information corresponding to second data. First data and the second data may be data with different priorities and/or in different groups. In this way, HARQ retransmission flexibility can be improved, and the first HARQ information is transmitted in a timelier manner, so that a data processing latency is reduced as much as possible.

18 Claims, 7 Drawing Sheets

(58) Field of Classification Search
CPC ... H04L 5/0033; H04L 5/0055; H04L 5/0064; H04L 5/0094; H04L 1/1887; H04L 1/1812; H04W 72/044; H04W 72/0446; H04W 72/0453; H04W 72/56
See application file for complete search history.

(56) References Cited

U.S. PATENT DOCUMENTS

2021/0218539 A1* 7/2021 Hu .................. H04L 1/1861
2022/0377813 A1* 11/2022 Wang ............... H04L 1/1861

FOREIGN PATENT DOCUMENTS

CN   109951262 A    6/2019
WO   WO-2020033623 A1 *  2/2020  ........... H04L 1/1614

OTHER PUBLICATIONS

VIVO, "Discussion on eMBB and URLLC UCI multiplexing", 3GPP TSG RAN WG1 Meeting #93, R1-1806064, Busan, Korea, May 21-May 25, 2018, XP051462329, 4 pages.

* cited by examiner

HARQ INFORMATION TRANSMISSION METHOD AND APPARATUS

CROSS-REFERENCE TO RELATED APPLICATIONS

This application is a continuation of International Application No. PCT/CN2021/086024, filed on Apr. 8, 2021, which claims priority to Chinese Patent Application No. 202010281527.1, filed on Apr. 10, 2020. The disclosures of the aforementioned applications are hereby incorporated by reference in their entireties

TECHNICAL FIELD

The embodiments relate to the field of communication technologies, a HARQ information transmission method, and an apparatus.

BACKGROUND

In a wireless communication system, because a time-varying characteristic and multipath fading of a wireless channel affect signal transmission, and some unpredictable interference causes a signal transmission failure, an indication method such as a hybrid automatic repeat request (HARQ) mechanism or an automatic repeat request (ARQ) is usually for performing error control. When data arrives at a receiving device, the receiving device performs error detection on the data; and returns an acknowledgement (ACK) if the data is received correctly; or returns a negative acknowledgement (NACK) if the data is received incorrectly. It is not difficult to understand that a sending device can learn, only after receiving HARQ information (the ACK/NACK) fed back by the receiving device, whether the data is successfully sent. Therefore, whether the receiving device can feed back the HARQ information in a timely manner affects a data processing latency.

It is pointed out in the 3rd generation partnership project (3GPP) radio access network layer 1 (RAN1) specification that a 5th generation (5G) new radio (NR) mobile communication system satisfies a requirement for quite high reliability and a low latency, and therefore should be capable of supporting an ultra-reliable and low-latency communications (URLLC)-type service. Typical URLLC services include, for example, tactile interactive applications such as wireless control in an industrial manufacturing or production process, motion control of a driverless car and a drone, remote repair, and remote surgery. These services are mainly characterized by ultra-high reliability, the low latency, a small amount of transmitted data, and burstiness.

Since R16, the 5G NR system may work on an unlicensed spectrum (unlicensed spectrum/shared spectrum). The NR system working on the unlicensed spectrum is also referred to as a new radio unlicensed band (NR-U) system. For the NR-U system, a sending device needs to first perform channel listening (channel access/channel sensing) before sending a signal and may send the signal only after determining that a channel is idle and not occupied by another device. This technology is also referred to as listen before talk (LBT). However, due to uncertainty of a channel usage status, the device cannot ensure that LBT can always succeed. For a HARQ feedback, a receiving device may not be capable of successfully sending HARQ information at a predetermined time point due to an LBT failure. Consequently, the sending device cannot learn whether data is successfully sent, and then a data processing latency is affected.

SUMMARY

The embodiments may provide a HARQ information transmission method and apparatus, to resolve a problem that HARQ information is not fed back in a timely manner.

According to a first aspect, a hybrid automatic repeat request HARQ information transmission method is provided and includes: A first device generates first HARQ information corresponding to first data, where the first HARQ information corresponds to a first time-frequency resource. The first device sends the first HARQ information on a second time-frequency resource, where the second time-frequency resource is a time-frequency resource for transmitting second HARQ information corresponding to second data, a time domain position of the second time-frequency resource is after a time domain position of the first time-frequency resource, and the first data and the second data are data with different priorities and/or in different groups.

In this embodiment, when the first device cannot successfully send the first HARQ information on the first time-frequency resource due to an LBT failure or another factor, or a second device cannot successfully receive the first HARQ information on the first time-frequency resource due to interference, the first device may retransmit the first HARQ information on the second time-frequency resource for transmitting the second HARQ information corresponding to the second data. Because the first data and the second data may be data with different priorities and/or in different groups, HARQ retransmission flexibility can be improved, and the first HARQ information is transmitted in a timelier manner, so that a data processing latency is reduced as much as possible, to better support a URLLC scenario.

The first HARQ information and the second HARQ information may be HARQ information corresponding to uplink data, and the first device may be a base station; the first HARQ information and the second HARQ information may be HARQ information corresponding to downlink data, and the first device may be a terminal device; or the first HARQ information and the second HARQ information may be HARQ information corresponding to sidelink data, and the first device may be a device on a sidelink.

That is, the embodiments may be applicable to a HARQ feedback of the uplink data, a HARQ feedback of the downlink data, or a HARQ feedback of the sidelink data, so that applicability of the solution can be improved. It should be appreciated that this is merely an example rather than a limitation.

The following describes a method for sending the first HARQ information by the first device on the second time-frequency resource based on an indication of the second device.

It should be understood that, when the first HARQ information and the second HARQ information are the HARQ information corresponding to the uplink data, the second device may be a terminal device; when the first HARQ information and the second HARQ information are the HARQ information corresponding to the downlink data, the second device may be a base station; or when the first HARQ information and the second HARQ information are the HARQ information corresponding to the sidelink data, the second device may be a device on the sidelink.

The first device may receive indication information from the second device, and then send the first HARQ information on the second time-frequency resource based on the indication information.

The first device retransmits, on the second time-frequency resource based on the indication of the second device, the first HARQ information that fails to be transmitted. In this way, implementation complexity of the first device can be reduced, the first device can retransmit the HARQ information on the second time-frequency resource more quickly, and the first HARQ information is transmitted in the timelier manner, so that the data processing latency is further reduced, to better support the URLLC scenario.

The indication information may include first indication information, and the first indication information indicates the first device to combine and send the first HARQ information and other HARQ information.

The first device combines and sends the first HARQ information and the other HARQ information. In this way, resource utilization can be improved, so that the data processing latency is further reduced, to better support the URLLC scenario.

The first indication information includes one or more of the following several items: a value of a priority or a group index of the first data corresponding to the first HARQ information; a quantity of priorities or group indexes of data corresponding to HARQ information that needs to be combined and sent; a value of a priority or a group index of data corresponding to the other HARQ information; first trigger information indicating whether to combine and send the first HARQ information and the other HARQ information; or bitmap information indicating a priority/group index of data corresponding to HARQ information that needs to be combined and sent.

An implementation in which the second device indicates to combine and send the first HARQ information and the other HARQ information can further reduce the implementation complexity of the first device and enable the first HARQ information to be transmitted in the timelier manner, so that the data processing latency is further reduced, to better support the URLLC scenario.

The indication information may include second indication information, and the second indication information indicates the first device to send the first HARQ information without sending other HARQ information. Correspondingly, the first device skips sending the second HARQ information on the second time-frequency resource but sends the first HARQ information on the second time-frequency resource.

The first device does not send the second HARQ information on the second time-frequency resource but sends the first HARQ information on the second time-frequency resource, so that transmission of the first HARQ information can be preferentially ensured, to better support the URLLC scenario.

The second indication information includes one or more of the following several items: a value of a priority or a group index of the other HARQ information that is not to be sent; a quantity of priorities or group indexes of data corresponding to the other HARQ information that is not to be sent; second trigger information indicating the first device to send the first HARQ information without sending the other HARQ information; or bitmap information indicating a priority or a group index of the other HARQ information that is not to be sent.

An implementation in which the second device indicates the first device not to send the second HARQ information on the second time-frequency resource but to send the first HARQ information on the second time-frequency resource can further reduce the implementation complexity of the first device, and enable the first HARQ information to be transmitted in the more timely manner, so that the data processing latency is further reduced, to better support the URLLC scenario.

The following describes a method for autonomously determining, by the first device, to send the first HARQ information on the second time-frequency resource.

The first device may autonomously determine, according to a preset policy, to send the first HARQ information on the second time-frequency resource.

The first device may autonomously determine, according to a preset policy, to send the first HARQ information on the second time-frequency resource, so that flexibility of the solution is improved.

The first device may combine and send the first HARQ information and the second HARQ information on the second time-frequency resource according to the preset policy; or give up, according to the preset policy, sending the second HARQ information on the second time-frequency resource, but send the first HARQ information on the second time-frequency resource.

The first device may combine and send the first HARQ information and the second HARQ information according to the preset policy. In this way, resource utilization can be improved, to better support the URLLC scenario. Alternatively, the first device gives up sending the second HARQ information but sends the first HARQ information. In this way, transmission of the first HARQ information can be preferentially ensured, to better support the URLLC scenario.

A priority of the second data is higher than the priority of the first data; a priority of the second data is lower than the priority of the first data; a group index of the second data is greater than the group index of the first data; or a group index of the second data is less than the group index of the first data.

The first device may further send third indication information, where the third indication information indicates whether there is other HARQ information on the second time-frequency resource in addition to the first HARQ information.

It should be understood that the first device may send the first HARQ information on the second time-frequency resource based on the indication of the second device and the first device may autonomously determine to send the first HARQ information on the second time-frequency resource.

The first device sends, to the second device, whether there is other HARQ information on the second time-frequency resource in addition to the first HARQ information, so that the second device correctly receives HARQ information, to improve reliability of the solution.

The first time-frequency resource and the second time-frequency resource are time-frequency resources on an unlicensed spectrum. It should be understood that the first device may send the first HARQ information on the second time-frequency resource based on the indication of the second device and the first device may autonomously determine to send the first HARQ information on the second time-frequency resource.

According to a second aspect, a hybrid automatic repeat request HARQ information transmission method is provided and includes: A first device receives first scheduling information from a second device, where the first scheduling information includes a third time-frequency resource of the second device and a wait indication, and the wait indication indicates the first device to receive second scheduling information. The first device receives the second scheduling information from the second device, where the second scheduling information includes a fourth time-frequency resource of the second device. The first device sends HARQ information on the fourth time-frequency resource based on the first scheduling information and the second scheduling information.

In this embodiment, when having no redundant time to share with the first device within currently obtained COT (namely, the third time-frequency resource), the second device may indicate, in a two-step indication manner, the first device to wait until next COT (namely, the fourth time-frequency resource) (where there is redundant time) of the sending device arrives and then send the HARQ information. This can ensure that the first device sends the HARQ information within time as short as possible, thereby reducing a data processing latency as much as possible, to better support a URLLC scenario.

The HARQ information may be HARQ information corresponding to uplink data, the first device may be a base station, and the second device may be a terminal device; the HARQ information may be HARQ information corresponding to downlink data, the first device may be a terminal device, and the second device may be a base station; or the HARQ information may be HARQ information corresponding to sidelink data, and the first device and the second device may be devices on a sidelink.

That is, the second aspect of the embodiments may be applicable to a HARQ feedback of the uplink data, a HARQ feedback of the downlink data, or a HARQ feedback of the sidelink data, so that applicability of the solution can be improved. Likewise, this is merely an example rather than a limitation.

Priorities of data scheduled by using the first scheduling information and the second scheduling information may be different and/or groups of data scheduled by using the first scheduling information and the second scheduling information may be different.

The two pieces of scheduling information corresponding to two-step indication may be scheduling information for scheduling the data with the different priorities or in the different groups, so that flexibility of the solution can be improved, to better support the URLLC scenario.

The third time-frequency resource and the fourth time-frequency resource are time-frequency resources that are on an unlicensed spectrum and that are obtained by the second device through listen before talk (LBT).

According to a third aspect, a hybrid automatic repeat request HARQ information transmission apparatus is provided. The apparatus includes modules configured to perform the method according to the first aspect.

For example, the apparatus includes: a processing module, configured to generate first HARQ information corresponding to first data, where the first HARQ information corresponds to a first time-frequency resource; and a sending module, configured to send the first HARQ information on a second time-frequency resource, where the second time-frequency resource is a time-frequency resource for transmitting second HARQ information corresponding to second data, a time domain position of the second time-frequency resource is after a time domain position of the first time-frequency resource, and the first data and the second data are data with different priorities and/or in different groups.

The apparatus may further include a receiving module, configured to receive indication information from a second device, where the sending module is configured to send the first HARQ information on the second time-frequency resource based on the indication information.

The indication information includes first indication information, and the first indication information indicates the apparatus to combine and send the first HARQ information and other HARQ information.

The first indication information includes one or more of the following several items: a value of a priority or a group index of the first data corresponding to the first HARQ information; a quantity of priorities or group indexes of data corresponding to HARQ information that needs to be combined and sent; a value of a priority or a group index of data corresponding to the other HARQ information; first trigger information indicating whether to combine and send the first HARQ information and the other HARQ information; or bitmap information indicating a priority/group index of data corresponding to HARQ information that needs to be combined and sent.

The indication information includes second indication information, and the second indication information indicates the apparatus to send the first HARQ information without sending other HARQ information; and the sending module is configured to skip sending the second HARQ information on the second time-frequency resource but send the first HARQ information on the second time-frequency resource.

The second indication information includes one or more of the following several items: a value of a priority or a group index of the other HARQ information that is not to be sent; a quantity of priorities or group indexes of data corresponding to the other HARQ information that is not to be sent; second trigger information indicating the apparatus to send the first HARQ information without sending the other HARQ information; or bitmap information indicating a priority or a group index of the other HARQ information that is not to be sent.

The sending module may be configured to autonomously determine, according to a preset policy, to send the first HARQ information on the second time-frequency resource. The sending module may be configured to: combine and send the first HARQ information and the second HARQ information on the second time-frequency resource; or give up sending the second HARQ information on the second time-frequency resource but send the first HARQ information on the second time-frequency resource.

The second data satisfies: A priority of the second data is higher than the priority of the first data; a priority of the second data is lower than the priority of the first data; a group index of the second data is greater than the group index of the first data; or a group index of the second data is less than the group index of the first data.

The sending module may be further configured to send third indication information, where the third indication information indicates whether there is other HARQ information on the second time-frequency resource in addition to the first HARQ information.

The first HARQ information and the second HARQ information are HARQ information corresponding to uplink data, and the apparatus is a base station; the first HARQ information and the second HARQ information are HARQ information corresponding to downlink data, and the apparatus is a terminal device; or the first HARQ information and the second HARQ information are HARQ information corresponding to sidelink data, and the apparatus is a device on a sidelink.

The first time-frequency resource and the second time-frequency resource may be time-frequency resources on an unlicensed spectrum.

According to a fourth aspect, a hybrid automatic repeat request HARQ information transmission apparatus is provided. The apparatus includes modules configured to perform the method according to the second aspect.

For example, the apparatus includes: a receiving module, configured to: receive first scheduling information from a second device, where the first scheduling information includes a third time-frequency resource of the second device and a wait indication, and the wait indication indicates the apparatus to receive second scheduling information; and receive the second scheduling information from the second device, where the second scheduling information includes a fourth time-frequency resource of the second device; and a sending module, configured to send HARQ information on the fourth time-frequency resource based on the first scheduling information and the second scheduling information.

Priorities of data scheduled by using the first scheduling information and the second scheduling information are different; and/or groups of data scheduled by using the first scheduling information and the second scheduling information are different.

The third time-frequency resource and the fourth time-frequency resource are time-frequency resources that are on an unlicensed spectrum and that are obtained by the second device through listen before talk (LBT).

According to a fifth aspect, a hybrid automatic repeat request (HARQ) information transmission apparatus is provided. The apparatus includes:

at least one processor; and a memory and a communication interface that are in communication connection with the at least one processor, where the memory stores instructions that can be executed by the at least one processor, and the at least one processor executes the instructions stored in the memory, to perform the method according to the first aspect or the second aspect.

The apparatus may be a terminal device or a network device.

According to a sixth aspect, a non-transitory computer-readable storage medium is provided and includes a program or instructions. When the program or the instructions are run on a computer, the method according to the first aspect, the first aspect, or the second aspect may be enabled to be performed.

According to a seventh aspect, a computer program product is provided. When the computer program product runs on a computer, the method according to the first aspect or the second aspect may be enabled to be performed.

According to an eighth aspect, a chip is provided. The chip is coupled to a memory and is configured to read and execute program instructions stored in the memory, to implement the method according to the first aspect or the second aspect.

For beneficial effects of the third aspect to the eighth aspect, refer to the beneficial effects of the first aspect and the second aspect. Details are not described herein again.

DETAILED DESCRIPTION OF THE EMBODIMENTS

Figure 1:
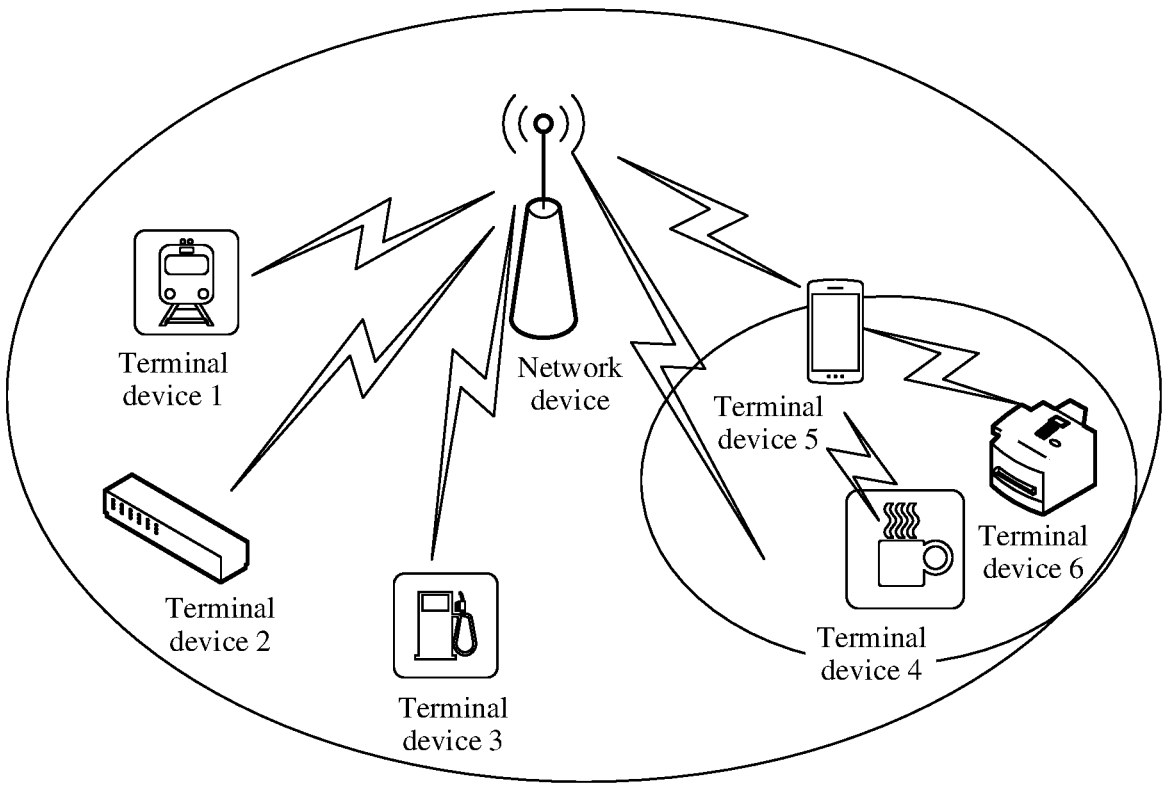
FIG. 1 is a schematic diagram of a structure of a communication system to which an embodiment is applicable.

To make objectives, solutions, and advantages of the embodiments clearer, the following further describes the embodiments in detail with reference to accompanying drawings.

An NR-U system may support HARQ information retransmission that is based on a group feedback manner. For example, for HARQ information that cannot be sent at an initially indicated position due to an LBT failure of a terminal or HARQ information that cannot be correctly received by a network device due to interference to the network device, the network device may indicate the terminal to retransmit the HARQ information without retransmitting data.

The network device may perform data scheduling by indicating group index (group index) information. HARQ information bits corresponding to physical downlink shared channel (PDSCH) data with a same group index are carried in one piece of HARQ information to be fed back together. For each group, there is a corresponding new feedback indicator (NFI), where the NFI is a toggle bit. If the NFI indicates toggling (for example, an NFI bit in previous indication information is "0", and an NFI bit in current indication information is "1"), for a group, NFI bit toggling may be used as a flag bit for generating corresponding HARQ information or may be understood as a trigger condition. That is, the first piece of PDSCH data corresponding to the HARQ information corresponding to the group should be data scheduled by using the first indication information of NFI bit toggling.

For the group, the network device further indicates downlink assignment indicator (DAI) information indicating, to the terminal device, a quantity of pieces of corresponding data in the HARQ information corresponding to the group, where the quantity may alternatively be understood as a quantity of HARQ information bits included in the corresponding HARQ information. Further, the network device may indicate, by indicating information about a quantity of groups, the terminal whether to combine and transmit HARQ information corresponding to a plurality of groups.

Based on the foregoing feedback mechanism, the network device may indicate, by using the NFI, a DAI, or another manner, the terminal to retransmit the HARQ information that fails to be transmitted. However, in this mechanism, a quantity of HARQ information retransmission occasions is small, and a HARQ information retransmission position is relatively fixed. For example, when HARQ information corresponding to a piece of data fails to be transmitted, the HARQ information needs to wait until a HARQ information transmission occasion corresponding to other data in a same group as the data arrives and then be fed back together with HARQ information corresponding to the other data. A HARQ information feedback latency is still long, causing an additional data processing latency and failing to satisfy a URLLC requirement.

When data processing latency is long because HARQ information is not fed back in a timely manner, the embodiments may provide a HARQ information transmission solution, so that the HARQ information can be transmitted more flexibly and in a more timely manner, and the data processing latency can be reduced as much as possible, to better support a URLLC scenario.

It should be understood that the embodiments may be applied to various communication systems, for example, a device to device (D2D) system, an internet of things (IoT) system, a vehicle-to-everything (V2X) system, and a narrowband internet of things (NB-IoT) system. It may be understood that the embodiments are not limited to a 4th generation (4G) communication system, a 5th generation (5G) communication system, a new communication system emerging in future communication development, and the like. The HARQ information transmission solution provided in the embodiments may be used provided that a HARQ feedback needs to be performed in the communication system.

For example, FIG. 1 shows a communication system to which an embodiment is applicable. The communication system includes a network device and terminal devices.

The network device is an entity configured to transmit or receive a signal on a network side and is configured to receive an uplink signal from the terminal device or send a downlink signal to the terminal device. The network device may be configured to mutually convert a received over-the-air frame and an internet protocol (IP) packet and serve as a router between the terminal device and a remaining part of an access network, where the remaining part of the access network may include an IP network and the like. The network device may further coordinate attribute management of an air interface. For example, the network device may be an evolved NodeB (eNB) in LTE, a new radio controller (NR controller), a gNodeB (gNB) in a 5G system, a centralized network element (centralized unit), a new radio base station, a radio remote module, a micro base station, a relay (relay), a distributed network element (distributed unit), a reception point (TRP), a transmission point (TP), or any other radio access device. However, the embodiments are not limited thereto. The network device may cover one or more cells.

The terminal device, also referred to as a terminal, is an entity configured to receive or transmit a signal on a user side and is configured to send the uplink signal to the network device or receive the downlink signal from the network device. The terminal device includes a device that provides a user with voice and/or data connectivity, for example, may include a handheld device having a wireless connection function or a processing device connected to a wireless modem. The terminal device may communicate with a core network through a radio access network (RAN) and exchange a voice and/or data with the RAN. The terminal device may include user equipment (UE), a V2X terminal device, a wireless terminal device, a mobile terminal device, a device-to-device (D2D) communication terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner.

By way of example but not limitation, in the embodiments, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn or integrated into clothes or an accessory of the user. The wearable device not only is a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus only on a type of application function and need to work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In the communication system shown in FIG. 1, the network device may send uplink scheduling information to the terminal device, and the terminal device may send uplink data based on the uplink scheduling information; and the network device may receive the uplink data, and send, based on a receiving status of the uplink data, HARQ information corresponding to the uplink data. For example, a terminal device 1 may send uplink data to the network device on an uplink, and the network device may feed back HARQ information corresponding to the uplink data to the terminal device 1; a terminal device 2 may send uplink data to the network device on an uplink, and the network device may feed back HARQ information corresponding to the uplink data to the terminal device 2; a terminal device 3 may send uplink data to the network device on an uplink, and the network device may feed back HARQ information corresponding to the uplink data to the terminal device 3; or a terminal device 5 may send uplink data to the network device on an uplink, and the network device may feed back HARQ information corresponding to the uplink data to the terminal device 5.

In the communication system shown in FIG. 1, the network device may send downlink scheduling information to the terminal device and send downlink data based on the downlink scheduling information; and the terminal device may receive the downlink data based on the downlink scheduling information, and send, based on a receiving status of the downlink data, HARQ information corresponding to the downlink data. For example, the network device may send downlink data to the terminal device 1 on a downlink, and the terminal device 1 may feed back HARQ information corresponding to the downlink data to the network device; the network device may send downlink data to the terminal device 2 on a downlink, and the terminal device 2 may feed back HARQ information corresponding to the downlink data to the network device; the network device may send downlink data to the terminal device 3 on a downlink, and the terminal device 3 may feed back HARQ information corresponding to the downlink data to the network device; or the network device may send downlink data to the terminal device 5 on a downlink, and the terminal device 5 may feed back HARQ information corresponding to the downlink data to the network device.

In the communication system shown in FIG. 1, any terminal device may send sidelink data to another terminal device; and another terminal device receives the sidelink data and sends HARQ information corresponding to the sidelink data to the any terminal device based on a receiving status of the sidelink data. For example, the terminal device 5 may send sidelink data to a terminal device 4 or 6 based on a sidelink (SL) between terminals, and the terminal device 4 or 6 feeds back HARQ information corresponding to the sidelink data to the terminal device 5 based on a receiving status of the data. Further, the terminal device 4 or 6 may alternatively send sidelink data to the terminal device 5, and the terminal device 5 feeds back HARQ information corresponding to the sidelink data to the terminal device 4 or 6 based on a receiving status of the sidelink data.

It should be noted that, if there is another type of data in the communication system, a corresponding HARQ feedback may be further performed for another type of data.

It should be further noted that FIG. 1 is merely a schematic diagram. A type of a communication system, a quantity and types of devices included in the communication system, and the like are not limited in the embodiments.

Based on the foregoing communication scenario, the following describes, with reference to the accompanying drawings, an implementation process of HARQ information transmission provided in the embodiments.

It should be understood that, in the embodiments, "at least one" means one or more, and "a plurality of" means two or more. The term "and/or" describes an association relationship between associated objects and represents that three relationships may exist. For example, A and/or B may represent the following cases: only A exists, both A and B exist, and only B exists, where A and B may be singular or plural. The character "/" in the embodiments generally indicates an "or" relationship between the associated objects. "At least one of the following (items)" or a similar expression thereof in the embodiments indicates any combination of the items and includes a singular item or any combination of plural items. For example, at least one of a, b, or c may represent: a, b, c, a and b, a and c, b and c, or a, b, and c, where a, b, and c may be singular or plural. "A plurality of" mentioned in the embodiments means two or more. In the descriptions, terms such as "first" and "second" are only for distinction and description but cannot be understood as indicating or implying relative importance, or as indicating or implying an order.

It should be understood that "HARQ information" in the embodiments is for representing a receiving status of data, that is, for representing whether the data is correctly received or decoded. Generally, the HARQ information includes two types: a NACK and an ACK. The NACK represents that the data is not correctly received or is incorrectly decoded, and the ACK represents that the data is correctly received or is correctly decoded. In the embodiments, the "HARQ information" may also be referred to as "HARQ-ACK information", "HARQ feedback information", "feedback information", or the like. In other words, terms such as the "HARQ information", the "HARQ feedback information", the "feedback information", and the "HARQ-ACK information" may be replaced with each other.

Figure 2:
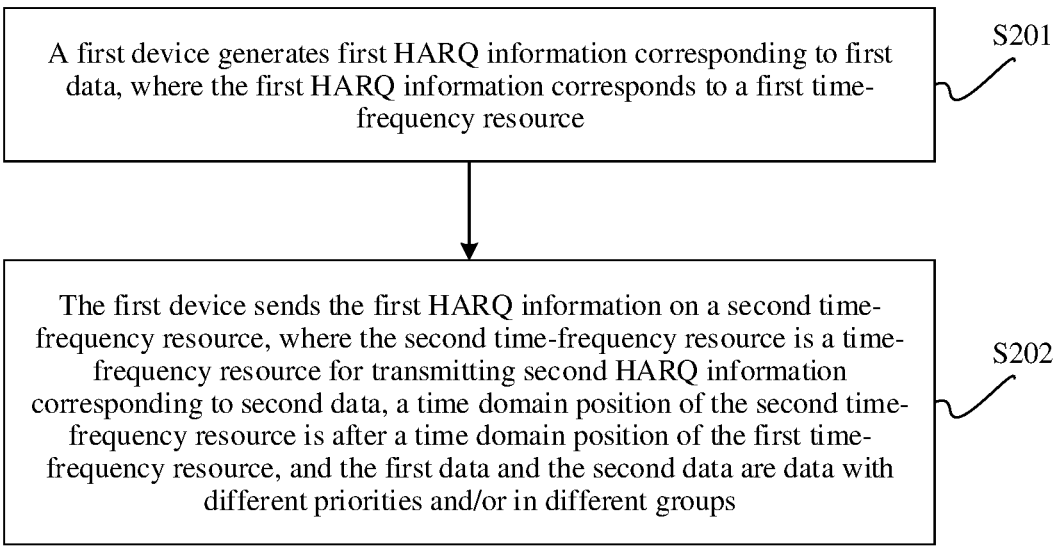
FIG. 2 is a flowchart of a HARQ information transmission method according to an embodiment.

As shown in FIG. 2, an embodiment may provide a HARQ information transmission method. The method is applicable to the communication system shown in FIG. 1. The method includes the following steps.

S201: A first device generates first HARQ information corresponding to first data, where the first HARQ information corresponds to a first time-frequency resource.

Before generating the first HARQ information, the first device receives the first data based on scheduling information. After receiving the first data from a second device based on the scheduling information, the first device generates, based on a receiving status of the first data, the first HARQ information corresponding to the first data. Therefore, the first HARQ information is for representing the receiving status of the first data.

There may be a plurality of types of scheduling information, and the types of the scheduling information may vary with different first data that is scheduled.

For example, the scheduling information may be downlink control information (Downlink Control Information, DCI). Scheduling information for scheduling downlink data may be referred to as downlink scheduling information such as DL DCI, such as DCI format 1_0, DCI format 1_1, and DCI format 1_2 in an NR system. Scheduling information for scheduling uplink data may be referred to as uplink scheduling information such as UL DCI, such as DCI format 0_0, DCI format 0_1, and DCI format 0_2 in the NR system.

The first HARQ information may include two types: an ACK and a NACK. If the first device correctly receives the first data, the first device generates the ACK; otherwise, the first device generates the NACK.

A value of HARQ information may be represented by using 0 or 1. For example, 0 is for representing a NACK, and 1 is for representing an ACK; or 1 is for representing a NACK, and 0 is for representing an ACK. A form is not limited.

In this embodiment, one piece of data or one transport block (TB) may correspond to 1-bit HARQ information. In some embodiments, a communication system may support transmission that is based on a code block group (CBG). That is, the TB is partitioned into N CBGs, and each CBG may be independently encoded and decoded. In this case, one data block may correspond to N-bit HARQ information, each CBG corresponds to the 1-bit HARQ information, and N is a positive integer greater than 1. Further, data may alternatively be received in another partition receiving manner. This is not limited herein. In conclusion, the piece of data may correspond to one or more HARQ information bits.

In the embodiments, a time-frequency resource may include a time domain resource and a frequency domain resource. The time domain resource may be a time resource such as a symbol, a slot, a second, or a microsecond. The frequency domain resource may be a frequency domain resource such as a resource element (RE), a resource block (RB), a resource block group, or a subcarrier.

It should be understood that, that the first HARQ information corresponds to a first time-frequency resource means that the first time-frequency resource is a time-frequency resource for transmitting the first HARQ information, and a time-frequency resource for the first HARQ information is a time-frequency resource for HARQ information corresponding to the first data. In other words, the first HARQ information should be sent on the first time-frequency resource. The first time-frequency resource may be determined by the first device or configured or indicated by the second device or another device. Resource types of the first time-frequency resource and manners of determining the first time-frequency resource may vary with different communication scenarios.

For example, the first data is uplink data, and the first HARQ information is HARQ information for the uplink data. In this case, the second device may be a terminal device, the first device may be a network device (for example, a base station or another access device), and the first time-frequency resource may be determined by the first device. The first data may be data (namely, PUCCH data) transmitted on a physical uplink control channel (PUCCH), data (namely, PUSCH data) transmitted on a physical uplink shared channel (PUSCH), or the like. The first time-frequency resource that carries the first HARQ information may be a downlink resource such as a physical downlink control channel (PDCCH) resource or a physical downlink shared channel (PDSCH) resource.

For example, the first data is downlink data, and the first HARQ information is HARQ information for the downlink data. In this case, the second device may be a network device (for example, a base station or another access device), the first device may be a terminal device, and the first time-frequency resource may be configured or indicated by the second device. The first data may be data (namely, PDCCH data) transmitted on a PDCCH, data (namely, PDSCH data) transmitted on a PDSCH, or the like. The first time-frequency resource that carries the first HARQ information may be an uplink resource such as a PUSCH resource or a PUCCH resource.

For example, the first data is sidelink data, and the first HARQ information is HARQ information for the sidelink data. In this case, the first device and the second device each are a terminal device, for example, a mobile phone, a computer, a wearable device, or a vehicle-mounted terminal device, on a sidelink. Types of the first device and the second device may be the same or different. This is not limited herein. The first time-frequency resource may be configured or indicated by another device (for example, a base station). The first data may be data (namely, PSCCH data) transmitted on a physical sidelink control channel (PSCCH), data (namely, PSSCH data) transmitted on a physical sidelink shared channel (PSSCH), or the like. The first time-frequency resource that carries the first HARQ information may be a sidelink resource such as a physical sidelink feedback channel (PSFCH) resource.

S202: The first device sends the first HARQ information on a second time-frequency resource, where the second time-frequency resource is a time-frequency resource for transmitting second HARQ information, the time-frequency resource for the second HARQ information is a time-frequency resource for HARQ information corresponding to second data, a time domain position of the second time-frequency resource is after a time domain position of the first time-frequency resource, and the first data and the second data are data with different priorities and/or in different groups.

The first device cannot successfully send the HARQ information on the first time-frequency resource due to an LBT failure or another factor, or the second device cannot successfully receive the first HARQ information on the first time-frequency resource due to interference. In this case, the first device may redetermine a time-frequency resource to send the first HARQ information, for example, the second time-frequency resource for transmitting the second HARQ information corresponding to the second data. Therefore, the time domain position of the second time-frequency resource is after the time domain position of the first time-frequency resource. That is, a sending time point of the second time-frequency resource is later than a sending time point of the first time-frequency resource.

In a possible implementation, resource types of the first time-frequency resource and the second time-frequency resource may be the same. For example, when the first data is downlink data, both the first time-frequency resource and the second time-frequency resource are PUCCH resources/PUSCH resources.

In another possible implementation, resource types of the first time-frequency resource and the second time-frequency resource may be different. For example, when the first data is downlink data, the first time-frequency resource is a PUCCH resource, and the second time-frequency resource is a PUSCH resource; or the first time-frequency resource is a PUSCH resource, and the second time-frequency resource is a PUCCH resource.

In a possible implementation, the first time-frequency resource and the second time-frequency resource may be in different bands. For example, the first time-frequency resource is a time-frequency resource on an unlicensed spectrum, and the second time-frequency resource is a time-frequency resource on a licensed spectrum; or the first time-frequency resource is a time-frequency resource on a licensed spectrum, and the second time-frequency resource is a time-frequency resource on an unlicensed spectrum.

In another possible implementation, the first time-frequency resource and the second time-frequency resource may be in a same band. For example, both the first time-frequency resource and the second time-frequency resource are time-frequency resources on an unlicensed spectrum.

In this embodiment, a priority may also be referred to as a level. A group may also be referred to as a data group, for example, a PDSCH group, a PUSCH group, or a TB group.

There may be at least the following three implementations in which the first data and the second data are the data with the different priorities and/or in the different groups.

In a first implementation, the first data and the second data are the data with the different priorities, and there is no concept of a group for the data. The priorities may be classified based on a service type, a quality of service (QoS) level, or the like of the data. This is not limited herein.

In a second implementation, the first data and the second data are the data in the different groups, and there is no concept of a priority for the data. Similarly, the data groups may be classified based on a service type or a QoS level of the data, a chronological order of occurrence of the data, or the like. This is not limited herein.

In a third implementation, the first data and the second data are the data in the different groups, and the different groups correspond to different priorities. In this case, it may also be understood as that the priorities are a special manner of classifying the groups.

In this embodiment, priority information and group information of data may be equivalently explained mutually. For example, the group information may implicitly indicate the priority information. For example, in some implementation solutions, the group information includes a group index. A smaller group index value of the data indicates a higher priority of the data. Assuming that a value range of a group index value is 0, 1, and 2, an index 0 represents a highest priority, an index 1 represents a second highest priority, and an index 2 represents a lowest priority. Additionally, there may alternatively be another correspondence between an index value and a priority. For example, a smaller group index value of the data indicates a lower priority of the data.

In this embodiment, priority information may alternatively be equivalent to group information. Data having a same priority may belong to the same data group. For example, assuming that a value range of a priority indicator is 0 and 1, data corresponding to a priority indicator 0 belongs to a group 0, and data corresponding to a priority indicator 1 belongs to a group 1.

In this embodiment, the priority may be for representing an urgency degree or an importance degree of the data. For example, a priority of URLLC data is high, and a priority of enhanced mobile broadband (eMBB) data is low. This is not limited to the foregoing example, and the priority may alternatively be defined in another manner. It may be understood that the priority may be predefined in a standard or may be dynamically configured by a network device.

For example, a higher priority represents a higher urgency degree or importance degree of the data, or a higher priority represents a lower urgency degree or importance degree of the data. For ease of description, an example in which the higher priority represents the higher urgency degree or importance degree of the data is used below.

In a possible implementation, the first device may preferentially ensure transmission of high-priority data.

Figure 3:
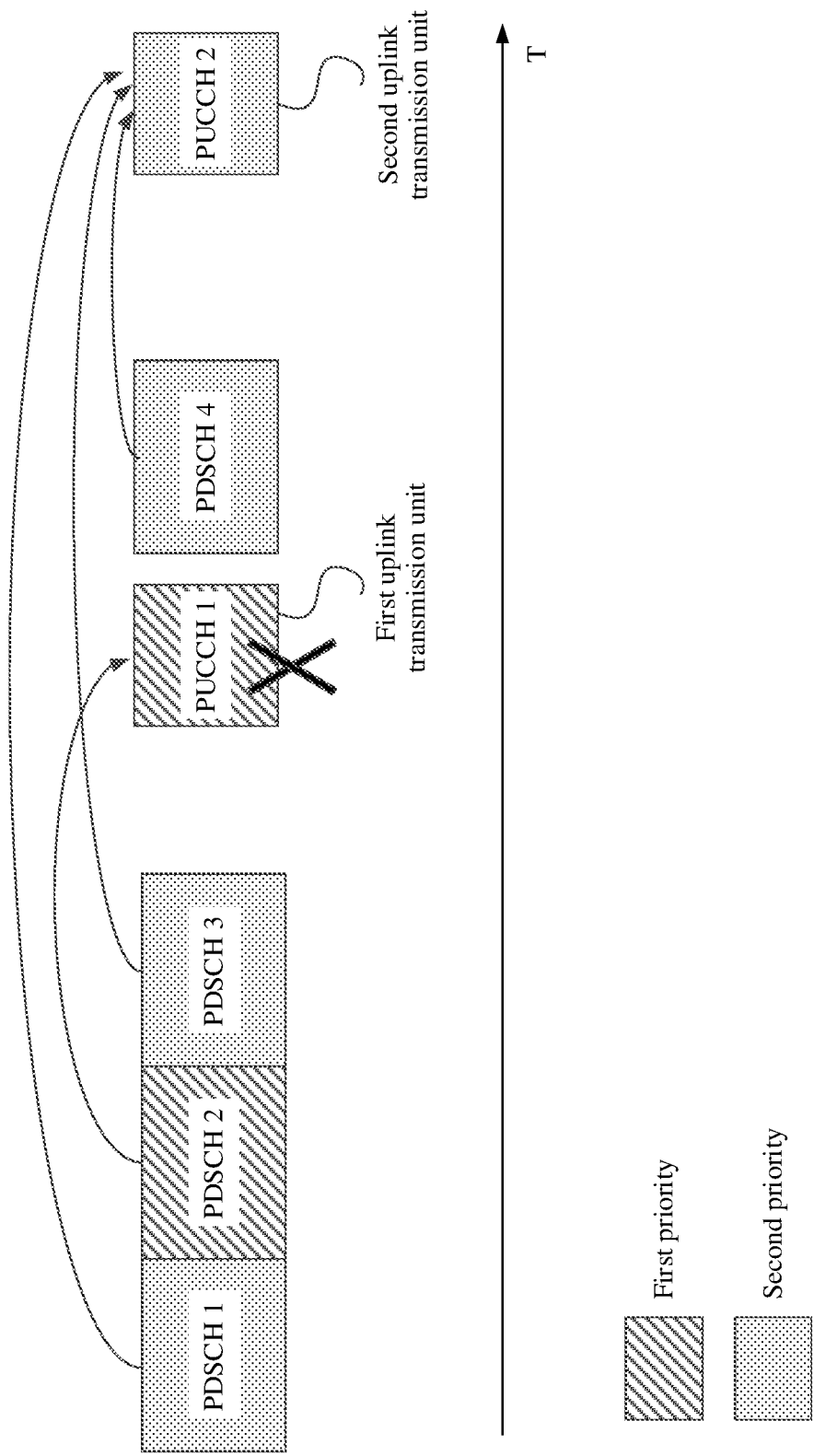
FIG. 3 shows a scenario of a HARQ feedback of downlink data according to an embodiment.

For example, FIG. 3 shows a HARQ feedback scenario of downlink data. In FIG. 3, the first device is UE, the second device is a base station, the first data and the second data are downlink data, the downlink data is carried on downlink transmission units PDSCHs, and HARQ information corresponding to the downlink data is carried on uplink transmission units PUCCHs. In FIG. 3, the first data is a first PDSCH (namely, a PDSCH 2), a priority of the first data is a first priority, the second data is second PDSCHs (including a PDSCH 1, a PDSCH 3, and a PDSCH 4), and a priority of the second data is a second priority. Assuming that the first priority is higher than the second priority, HARQ feedback information corresponding to the PDSCH 2 is preferentially transmitted over HARQ feedback information corresponding to the PDSCH 1, the PDSCH 3, and the PDSCH 4. Therefore, a first uplink transmission unit (a PUCCH 1) is earlier than a second uplink transmission unit (a PUCCH 2) in FIG. 3. It should be understood that the uplink transmission units herein are time-frequency units occupied by uplink transmission in time domain and frequency domain. The uplink transmission units in FIG. 3 may be PUCCH units. In some implementation solutions, the PUCCH unit herein may also be referred to as a PUCCH occasion. Lines each having a directional arrow in FIG. 3 are for associating the PDSCH data with the uplink transmission units, and each piece of PDSCH data is configured or indicated to be fed back on an uplink transmission unit associated with the PDSCH data.

Further, in a possible implementation, the first device may preferentially ensure transmission of HARQ information of the high-priority data. That is, the priority of the second data may be lower than the priority of the first data, so that it can be ensured that the HARQ information of the high-priority data is preferentially transmitted, thereby better ensuring a processing latency of the high-priority data.

FIG. 3 is still used as an example. It is assumed that the first priority is higher than the second priority. After receiving the first-priority PDSCH data, the terminal device should have sent, on the first uplink transmission unit, the HARQ feedback information corresponding to the data on the PDSCH 2. However, in an unlicensed band, the terminal device needs to perform LBT before the first uplink transmission unit, to listen to a status of a channel The terminal device learns, through listening, that the channel is occupied by another device. As a result, the device cannot send, on the first uplink transmission unit, the HARQ feedback information corresponding to the data on the PDSCH 2. As shown in FIG. 3, a black graph "X" represents that the HARQ information fails to be sent. It may be understood that, if the terminal cannot feed back, in a timely manner, the HARQ feedback information corresponding to the data on the PDSCH 2, the base station cannot learn of a receiving status of the data on the PDSCH 2, and an additional processing latency is caused. In this case, the terminal device may retransmit the HARQ feedback information corresponding to the data on the PDSCH 2 on an uplink transmission unit, namely, the second uplink transmission unit (the PUCCH 2), after the first uplink transmission unit. However, the second uplink transmission unit should have been for transmitting the second-priority HARQ information corresponding to the PDSCH 1, the PDSCH 3, and the PDSCH 4. In this way, the HARQ information of the high-priority data is retransmitted on a HARQ transmission resource (namely, a time-frequency resource for transmitting HARQ information) of low-priority data, and it is ensured that the HARQ information of the high-priority data is preferentially transmitted, thereby ensuring the processing latency of the high-priority data as much as possible.

In another possible implementation, the priority of the second data may alternatively be higher than the priority of the first data. In this way, HARQ information feedback flexibility can be improved.

FIG. 3 is still used as an example. It is assumed that the first priority is lower than the second priority. The second uplink transmission unit should have been configured to send the HARQ information corresponding to the second-priority data. Therefore, it should be ensured as much as possible that the HARQ information corresponding to the second-priority data is transmitted on the second uplink transmission unit, and the HARQ information corresponding to the first-priority data is not transmitted on the second uplink transmission unit. However, because a data amount of actually transmitted second-priority data is small, and there is a large amount of an idle resource on the second uplink transmission unit, to ensure as much as possible that all HARQ information can be transmitted in a timely manner, the HARQ information corresponding to the first-priority data may also be carried on the second uplink transmission unit for retransmission.

Also, to further improve flexibility of HARQ information transmission, the priority of the second data may alternatively be equal to the priority of the first data. In other words, the first device may retransmit, on a HARQ transmission resource corresponding to data having a same priority, the first HARQ information that needs to be retransmitted.

In this embodiment, the first device may send the first HARQ information on the second time-frequency resource based on scheduling of a network device, or the first device may autonomously determine to send the first HARQ information on the second time-frequency resource. This is not limited in this embodiment.

The following separately describes the two solutions in detail.

Solution 1: The first device sends the first HARQ information on the second time-frequency resource based on scheduling of the network device.

When the first data is downlink data, a terminal device (the first device) cannot successfully send the HARQ information on the first time-frequency resource due to the LBT failure or another factor, or the network device (the second device) cannot successfully receive the first HARQ information on the first time-frequency resource due to the interference. In this case, the network device may send indication information to the first device, and the first device determines the second time-frequency resource based on the indication information, and then sends the first HARQ information on the second time-frequency resource.

When the first data is uplink data, a network device (namely, the first device, for example, a base station) cannot successfully send the HARQ information on the first time-frequency resource due to the LBT failure or the another factor, or a terminal device (the second device) cannot successfully receive the first HARQ information on the first time-frequency resource due to the interference. In this case, the first device determines the second time-frequency resource, and then sends the first HARQ information on the second time-frequency resource. Alternatively, optionally, another network device (for example, another base station or a core network) may send indication information to the first device, and the first device determines the second time-frequency resource based on the indication information, and then sends the first HARQ information on the second time-frequency resource.

When the first data is sidelink data, a terminal device (the first device) at a data receive end cannot successfully send the HARQ information on the first time-frequency resource due to the LBT failure or the another factor, or a terminal device (the second device) at a data transmit end cannot successfully receive the first HARQ information on the first time-frequency resource due to the interference. In this case, the network device (for example, a base station) may send indication information to the first device, and the first device determines the second time-frequency resource based on the indication information, and then sends the first HARQ information on the second time-frequency resource.

The indication information may be scheduling information for scheduling data, or the indication information is included in scheduling information for scheduling data. For example, the first data and the second data are downlink data, and the indication information is downlink scheduling information, for example, downlink DCI.

In a possible implementation, the scheduling information (indication information) may include first indication information, and the first indication information may indicate the first device to combine and send the first HARQ information and other HARQ information. Combining and sending may be understood as that the first device sends the first HARQ information and the other HARQ information on a same time-frequency resource. For example, the first indication information may be sent via DCI or radio resource control (radio resource control, RRC) signaling.

For example, in downlink scheduling information corresponding to the PDSCH 4 in FIG. 3, the base station may indicate, by using the first indication information, the UE to send both the first HARQ information (the HARQ information corresponding to the PDSCH 2) and the second HARQ information (the HARQ information corresponding to the PDSCH 1, the PDSCH 3, and the PDSCH 4) on the PUCCH 2.

It should be understood that combining and sending herein may be understood as append sending. The first HARQ information may be appended to the second time-frequency resource for sending, where the second time-frequency resource should not have been for sending the first HARQ information. For ease of description, the first indication information is also referred to as indication information of HARQ information combining and sending in the embodiments.

The first indication information may include one or more of the following several items.

(1) A value of the priority or a group index of the first data corresponding to the first HARQ information.

It is assumed that a value range of the value of the priority is 0 and 1, and it represents that indication of two priorities is supported. FIG. 3 is used as an example. Assuming that a value of the first priority is 0, a value of the second priority is 1, and the first data is the PDSCH 2, the value of the priority of the first data corresponding to the first HARQ information is 0.

(2) A value of a priority or a group index of data corresponding to HARQ information that needs to be combined and sent. It should be understood that the HARQ information that needs to be combined and sent herein includes the first HARQ information and the other HARQ information.

FIG. 3 is used as an example. The first data is the PDSCH 2, the second data is the PDSCH 4, the PDSCH 3, and the PDSCH 1, and the HARQ information corresponding to the first data and the second data needs to be combined and sent. In this case, values of the priorities of the data corresponding to the HARQ information that needs to be combined and sent include a value 0 of the first priority and a value 1 of the second priority.

(3) A quantity of priorities or group indexes of data corresponding to HARQ information that needs to be combined and sent.

FIG. 3 is used as an example. The first data is the PDSCH 2, the second data is the PDSCH 4, the PDSCH 3, and the PDSCH 1, and the HARQ information corresponding to the first data and the second data needs to be combined and sent. In this case, the quantity of priorities or group indexes of the data corresponding to the HARQ information that needs to be combined and sent is 2.

(4) A value of a priority or a group index of data corresponding to the other HARQ information.

FIG. 3 is used as an example. The first data is the PDSCH 2, the second data is the PDSCH 3, and the data corresponding to the other HARQ information is the second data. In this case, the value of the priority of the data corresponding to the other HARQ information is a value 1 of the second priority.

(5) A quantity of priorities or group indexes of data corresponding to the other HARQ information.

FIG. 3 is used as an example. The first data is the PDSCH 2, the second data is the PDSCH 4, the PDSCH 3, and the PDSCH 1, and the data corresponding to the other HARQ information is the second data, namely, the PDSCH 3. In this case, the quantity of priorities or group indexes of the data corresponding to the other HARQ information is 1.

(6) Bitmap information indicating a priority/group index of data corresponding to HARQ information that needs to be combined and sent.

A HARQ feedback of downlink data is used as an example. Assuming that a value range of a value of a priority is 0, 1, 2, and 3, the base station may indicate, by using a 4-bit bitmap, priorities corresponding to HARQ information that needs to be combined by the UE. Each bit in the bitmap corresponds to one priority, and four bits respectively correspond to priorities 0, 1, 2, and 3. If a value of a bit is 1, it represents that HARQ information corresponding to a priority corresponding to the bit needs to be combined. For example, "0110" represents that the UE needs to combine second feedback information and third feedback information that correspond to the priorities 1 and 2.

(7) First trigger information indicating whether to combine and send the first HARQ information and the other HARQ information.

For example, a 1-bit field in the scheduling information may be for indication. If a value of the field is 1, it represents that combination is required. If a value of the field is 0, it represents that combination is not required.

In some implementation solutions, the first trigger information may indicate the first device to combine HARQ information corresponding to all priorities. FIG. 3 is used as an example. The first device may combine and send all HARQ information corresponding to the PDSCH 1, the PDSCH 2, the PDSCH 3, and the PDSCH 4 on the PUCCH 2.

It may be understood that a value range of a value of a priority may alternatively be another value range, for example, 0, 1, 2, and 3. That is, indication of four priorities is supported. The four priorities respectively correspond to a first PDSCH, a second PDSCH, a third PDSCH, and a fourth PDSCH, and corresponding HARQ information is respectively first feedback information, second feedback information, third feedback information, and fourth feedback information. In this case, the first trigger information may indicate that the first device needs to combine and send the first feedback information, the second feedback information, the third feedback information, and the fourth feedback information.

In some other implementation solutions, the first trigger information may indicate that the first device needs to combine all feedback information corresponding to data having a priority not lower than a current priority. For example, it is assumed that a level order of four priorities is 0>1>2>3. That is, a value 0 of a priority indicator represents a highest priority (where it may be understood that there may alternatively be another solution to a level order, and this is not limited). In this case, priority information included in downlink scheduling indication information corresponding to a third PDSCH is 2 (for example, indicated by using a field, namely, priority=2). If the downlink scheduling indication information corresponding to the third PDSCH further includes the first trigger information, it represents that the first device needs to combine feedback information, namely, first feedback information, second feedback information, and third feedback information, corresponding to data (namely, a first PDSCH, a second PDSCH, and the third PDSCH, corresponding to priorities 0, 1, and 2) having a priority not lower than a current priority 2. That is, the first device needs to send the first feedback information, the second feedback information, and the third feedback information together on a third PUCCH.

It should be noted that, in this embodiment, the other HARQ information that is sent in combination with the first HARQ information may include the second HARQ information or may not include the second HARQ information. This is not limited in this embodiment.

In some implementation solutions, the first device may determine, based on content of the first indication information, whether the other HARQ information that is sent in combination with the first HARQ information needs to include the second data.

For example, the first indication information includes the value of the priority or the group index of the data corresponding to the other HARQ information. In this case, if the priority of the data corresponding to the other HARQ information does not include the priority of the second data, or the value of the group index of the data corresponding to the other HARQ information does not include a value of a group index of the second data, it represents that the other HARQ information that is sent in combination with the first HARQ information does not include the second data. That is, the first device does not send the second data on the second time-frequency resource. Conversely, if the priority of the data corresponding to the other HARQ information includes the priority of the second data, or the value of the group index of the data corresponding to the other HARQ information includes a value of a group index of the second data, it represents that the other HARQ information that is sent in combination with the first HARQ information includes the second data. That is, the first device further sends, on the second time-frequency resource, the second data in addition to the first data.

In another possible implementation, the scheduling information (indication information) may include second indication information, and the second indication information indicates the first device to send the first HARQ information without sending other HARQ information. For example, the second indication information may be carried in DCI or RRC signaling.

After receiving the scheduling information, based on the second indication information, the first device does not send the second HARQ information on the second time-frequency resource, but sends the first HARQ information on the second time-frequency resource. In some implementation solutions, a size of a resource on an uplink transmission unit is limited, and reliability is reduced because excessive information bits are carried. Therefore, the first device may be indicated to discard some HARQ feedback information, to ensure transmission reliability. For ease of description, the second indication information is also referred to as indication information of HARQ information discarding in the embodiments.

The second indication information may include one or more of the following several items.

(1) A value of a priority or a group index of the other HARQ information that is not to be sent.

For example, assuming that there are four priorities of data in total, priorities values corresponding to a first priority, a second priority, a third priority, and a fourth priority are respectively 0, 1, 2, and 3, and feedback information corresponding to data of the priorities 0, 1, 2, and 3 is respectively first feedback information, second feedback information, third feedback information, and fourth feedback information, the base station may indicate the UE to discard the third feedback information and the fourth feedback information that correspond to the priorities 2 and 3, and may directly indicate values 2 and 3 of corresponding priority indicators.

(2) A quantity of priorities or group indexes of data corresponding to the other HARQ information that is not to be sent.

For example, the base station may indicate to the UE that a quantity of priorities that need to be discarded is 2, representing that HARQ-ACK feedback information corresponding to the first two lowest priorities needs to be discarded.

(3) Second trigger information indicating the first device to send the first HARQ information without sending the other HARQ information.

For example, a 1-bit field in the scheduling information may be for indication. If a value of the field is 1, it represents that discarding is required. If a value of the field is 0, it represents that discarding is not required.

In some implementation solutions, the second trigger information may indicate to discard HARQ information corresponding to current-priority data (namely, the data scheduled by using the scheduling information in which the second trigger information is located).

In some other implementation solutions, the second trigger information indicates to discard HARQ information corresponding to current-priority data and feed back HARQ information corresponding to data having a priority higher than a current priority. For example, it is assumed that a level order of four priorities is 0>1>2>3. That is, a value 0 of a priority indicator represents a highest priority. In this case, priority information included in downlink scheduling indication information corresponding to a third PDSCH is 2 (for example, by using a field, namely, priority=2). If the downlink scheduling indication information corresponding to the third PDSCH further includes the second trigger information, it represents that the UE needs to discard the HARQ information corresponding to the current-priority data, namely, the third PDSCH, and send the HARQ information (namely, first feedback information and second feedback information) corresponding to the data having the priority higher than the current priority on a third PUCCH together.

(4) Bitmap (bitmap) information indicating a priority or a group index of the other HARQ information that is not to be sent.

For example, assuming that a value range of a value of a priority indicator is 0, 1, 2, and 3, the base station may indicate, by using a 4-bit bitmap, priorities corresponding to HARQ information that needs to be discarded by the UE. Each bit in the bitmap corresponds to one priority, and four bits respectively correspond to priorities 0, 1, 2, and 3. If a value of a bit is 1, it represents that HARQ-ACK feedback information corresponding to a priority corresponding to the bit needs to be discarded. For example, "0110" represents that the UE needs to discard second feedback information and third feedback information that correspond to the priorities 1 and 2.

It should be noted that, in this embodiment, the scheduling information (indication information) may include other indication information in addition to the first indication information or the second indication information.

For example, the scheduling information (indication information) may further include one or more of the following indication information.

(1) Data indication information indicating the first device to receive the first data. It may be understood that the data indication information includes information, for example, resource allocation information and modulation and coding indication information, required when the terminal receives the first data.

FIG. 3 is used as an example. Assuming that first downlink scheduling information is for scheduling data PDSCH 2, the first scheduling information may further include indication information of the PDSCH 2.

(2) Priority information indicating the priority of the first data.

FIG. 3 is used as an example. Assuming that first downlink scheduling information is for scheduling the PDSCH 2, the first downlink scheduling information may include priority information of the PDSCH 2, for example, the value 0 of the first priority.

(3) Data group information indicating a data group of the first data.

FIG. 3 is used as an example. It is assumed that the PDSCH 1 and the PDSCH 3 are data in a same group. Assuming that an index value of the group is m, scheduling information DCI 1 is for scheduling the PDSCH 1, and scheduling information DCI 3 is for scheduling the PDSCH 1, both the DCI 1 and the DCI 3 include the index value m of the group.

(4) HARQ feedback resource information indicating information about a resource that carries the first HARQ information.

Optionally, the resource information herein may include time domain information and/or frequency domain information. The time domain information indicates information about a time unit occupied in time domain by the resource for carrying the first HARQ information. The time unit may be one or more of time units such as a symbol, a slot, a second, and a microsecond. The frequency domain information indicates information about a frequency domain unit occupied in frequency domain by the resource for carrying the first HARQ information. The frequency domain unit may be one or more of a resource element (RE), a resource block (RB), a resource block group, a subcarrier, and the like.

For example, when the first HARQ information is carried on a PUCCH, the HARQ feedback resource information corresponding to the first data may be indicated by using indication information of a PUCCH resource. It may be understood that the first device may learn, based on the HARQ feedback resource information, a PUCCH resource on which the first HARQ information is sent.

(5) HARQ feedback time information indicating a time point at which the first device is to send the first HARQ information, and the first device may learn of the time point of sending the first HARQ information.

Optionally, the time information herein may be an absolute time information point or relative time offset information.

(6) New feedback indicator information indicating whether transmission of the first HARQ information corresponding to the first data is new transmission or retransmission.

In some implementation solutions, the new feedback indicator may further indicate, to the first device, how to generate the first HARQ feedback information.

Solution 2: The first device autonomously determines to send the first HARQ information on the second time-frequency resource.

The first device cannot successfully send the HARQ information on the first time-frequency resource due to the LBT failure or another factor, or the second device cannot successfully receive the first HARQ information on the first time-frequency resource due to the interference. In this case, the first device may autonomously determine, according to a preset policy, to send the first HARQ information on the second time-frequency resource. It should be understood that Solution 2 is also applicable to a HARQ feedback scenario corresponding to uplink data, downlink data, sidelink data, or the like.

In a possible implementation, the preset policy may include: The first device combines and sends the first HARQ information and the second HARQ information on the second time-frequency resource; or the first device gives up sending the second HARQ information on the second time-frequency resource but sends the first HARQ information on the second time-frequency resource.

Combining and sending herein may be understood as append sending. The first HARQ information may be appended to the second time-frequency resource for sending, where the second time-frequency resource should not have been for sending the first HARQ information. This is similar to Solution 1. For ease of description, first indication information is also referred to as indication information of HARQ information combining and sending in the embodiments.

There may be other HARQ information, for example, third HARQ information corresponding to third data, on the second time-frequency resource herein in addition to the first HARQ information and the second HARQ information. This is similar to Solution 1. The third HARQ information transmitted on the second time-frequency resource may be newly transmitted HARQ information or may be retransmitted HARQ information. This is not limited herein.

In a possible implementation, the preset policy may alternatively include: The first device selects, as the second time-frequency resource, a HARQ transmission resource on which data corresponding to a HARQ feedback satisfies a preset condition.

For example, when determining that the priority of the second data is lower than the priority of the first data, the first device sends, on the second time-frequency resource, the first HARQ information corresponding to the first data. That is, HARQ retransmission is required to occupy a HARQ transmission resource corresponding to data having a lower priority, to ensure as much as possible a HARQ transmission latency corresponding to the high-priority data.

For example, when determining that the priority of the second data is equal to the priority of the first data, the first device sends, on the second time-frequency resource, the first HARQ information corresponding to the first data. That is, HARQ retransmission is required to occupy a HARQ transmission resource corresponding to data having a same priority. In this way, preemption of a HARQ transmission resource corresponding to higher-priority data can be avoided, and then a HARQ transmission latency corresponding to the higher-priority data is ensured.

In addition, when determining that the priority of the second data is higher than the priority of the first data, the first device may alternatively send, on the second time-frequency resource, the first HARQ information corresponding to the first data. For example, in some scenarios, when a HARQ transmission resource corresponding to higher-priority data is sufficient (where there is an idle resource), retransmission of the first HARQ information may alternatively occupy the HARQ transmission resource corresponding to the higher-priority data.

A priority in Solution 2 and a group may also be equivalently explained. This is similar to Solution 1. For details, refer to the foregoing related descriptions. Details are not described herein again.

In a possible implementation, the preset policy may alternatively include: The first device determines, based on a preset condition, whether to send the second HARQ information on the second time-frequency resource.

For example, when determining that the second time-frequency resource is sufficient (where the second time-frequency resource can support the first device in sending the first HARQ information and the second HARQ information), the first device combines and sends the first HARQ information and the second HARQ information on the second time-frequency resource. When determining that the second time-frequency resource is insufficient (where the second time-frequency resource cannot support the first device in sending the first HARQ information and the second HARQ information), the first device gives up sending the second HARQ information on the second time-frequency resource but sends the first HARQ information on the second time-frequency resource.

Because HARQ information carried on the second time-frequency resource is autonomously determined by the first device, the first device needs to send, to the second device, related indication information indicating whether HARQ information corresponding to another priority is autonomously carried.

In a possible implementation, the first device sends third indication information to the second device, where the third indication information indicates whether there is other HARQ information on the second time-frequency resource in addition to the first HARQ information, or the third indication information indicates data corresponding to HARQ information carried on the second time-frequency resource.

The third indication information may be carried in HARQ information. For example, information about a most significant bit, a least significant bit, or another preset bit position of the first HARQ information is for representing whether the HARQ information of another priority is carried, where "1" represents that the HARQ information of another priority is carried, and "0" represents that the HARQ information of another priority is not carried.

For example, as shown in FIG. 3, the first device autonomously chooses to combine and send first feedback information (the HARQ information corresponding to the first-priority data) and second feedback information (the HARQ information corresponding to the second-priority data) on the PUCCH 2. That is, it represents that HARQ information corresponding to another priority (the second priority) is carried on the PUCCH 2. In this case, when combining the feedback information, the first device first sends "1" on the most significant bit, to represent that the HARQ information of another priority is carried, then sorts the first feedback information and the second feedback information in descending order of the priorities, and finally sends the first feedback information and the second feedback information on the PUCCH 2.

It should be understood that this implementation is also applicable to Solution 1. When the first device sends the first HARQ information on the second time-frequency resource based on scheduling of the network device, the first device may alternatively send, to the second device, the related indication information indicating whether the HARQ information corresponding to the another priority is carried.

In a possible implementation, to avoid information inconsistency between the first device and the second device, a size of HARQ information may be a preset size, for example, M bits, where M is a positive number. For example, the HARQ information sent by the first device on the PUCCH 2 in FIG. 3 is used as an example. When generating the HARQ information, the first device may perform mapping successively in a preset order, for example, in an order from a high bit to a low bit, where a highest bit is for representing whether the HARQ information of another priority is carried.

If the HARQ information of another priority needs to be carried, a highest bit is mapped to "1", and feedback information corresponding to different priorities in descending order is successively mapped to sequential M−1 bits in descending order. For example, the first feedback information and the second feedback information are successively mapped. It is assumed that a total quantity of bits corresponding to the first feedback information and the second feedback information is N. If N<M−1, a default value, for example, a NACK, that is, "0", is mapped to the last M−1—N bits. If N>M−1, a default value, for example, a NACK, that is, "0", is mapped to the last N—M+1 bits.

If the HARQ information of another priority does not need to be carried, a highest bit is mapped to "0". That is, the first device only needs to send the second feedback information. Assuming that a quantity of bits corresponding to the second feedback information is L, the second feedback information is successively mapped to sequential N bits in descending order, and a default value, for example, "0", is mapped to the last M−1−L bits.

It should be understood that this implementation is also applicable to Solution 1. When the first device sends the first HARQ information on the second time-frequency resource based on scheduling of the network device, the size of the HARQ information may alternatively be the preset size.

This embodiment may propose the HARQ information retransmission indication solution, so that when the first device cannot successfully send the first HARQ information on the first time-frequency resource due to the LBT failure or the another factor, or the second device cannot successfully receive the first HARQ information on the first time-frequency resource due to the interference, the first device may retransmit the first HARQ information on the second time-frequency resource for transmitting the second HARQ information corresponding to the second data. Because the first data and the second data may be the data with the different priorities and/or in the different groups, HARQ retransmission flexibility can be improved, and the first HARQ information is transmitted in a timelier manner, so that a data processing latency is reduced as much as possible, to better support a URLLC scenario.

On an unlicensed spectrum, a sending device (namely, a device that sends data) may obtain corresponding channel occupancy time (COT) through LBT. After obtaining the COT of the sending device, the sending device may share the COT with a receiving device (namely, a device that receives the data) corresponding to the sending device, so that the receiving device can quickly access a channel through fast LBT or without performing LBT, to reduce LBT overheads of a system and improve data transmission efficiency.

For example, to reduce LBT overheads of UE, a base station may first obtain COT through LBT, and then share the COT with the UE. When the UE performs a HARQ feedback of downlink data, the base station indicates as much as possible the UE to send HARQ information within the COT of the base station, to ensure as much as possible that the UE can send the HARQ information in a timely manner and reduce a data processing latency.

However, the COT obtained by the sending device does not necessarily well support the receiving device in sending the data. For example, an amount of data scheduled by the base station within the COT is large. As a result, there is no redundant time within the COT to be shared with the UE for use. It can be understood that, in this case, the sending device cannot share the COT of the sending device with the receiving device, and the receiving device needs to additionally perform LBT to obtain COT. This cannot satisfy a requirement of a URLLC scenario.

Figure 4:
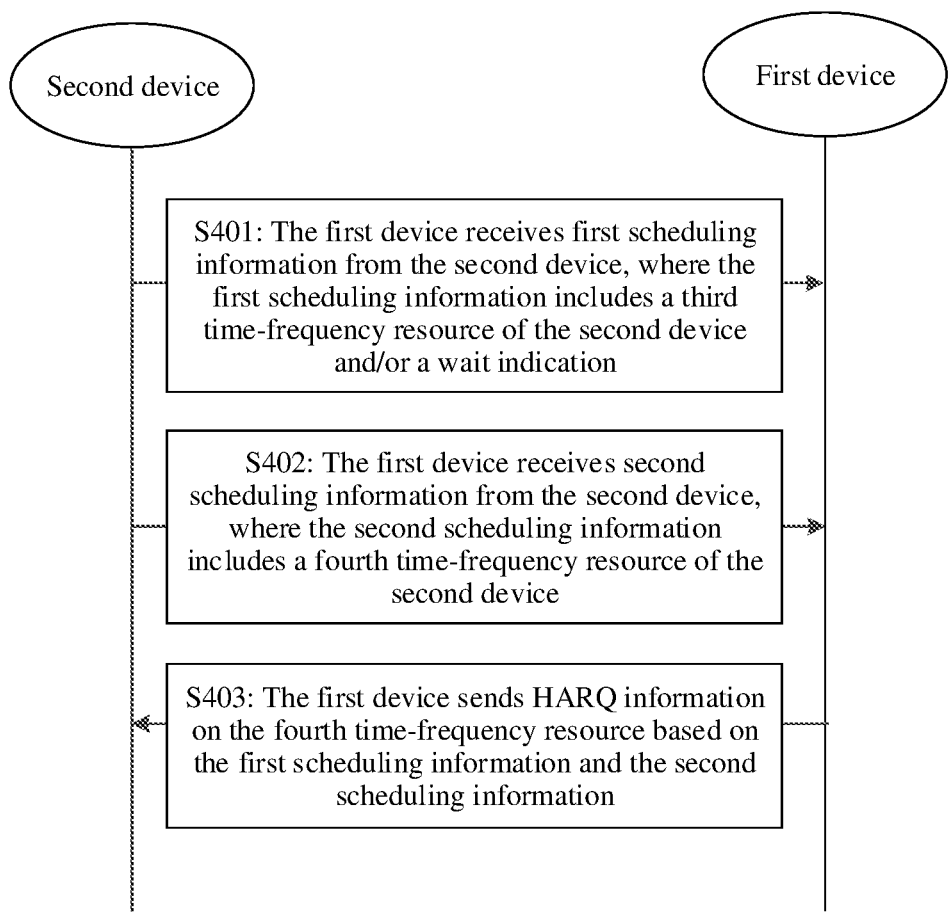
FIG. 4 is a flowchart of another HARQ information transmission method according to an embodiment.

For the foregoing problem, refer to FIG. 4. An embodiment may further provide a HARQ information transmission method. The method is applicable to the communication system shown in FIG. 1. The method includes the following steps.

S401: A second device sends first scheduling information, and a first device receives the first scheduling information from the second device, where the first scheduling information includes a third time-frequency resource of the second device and/or a wait indication.

The first device is a device (namely, a receiving device) that receives data, and the second device is a device (namely, a sending device) that sends the data. The wait indication indicates the first device to (wait to) receive second scheduling information and send HARQ information with reference to the first scheduling information and the second scheduling information. In the embodiments, based on the wait indication, the first device needs to send the HARQ information after the second device performs scheduling twice. Therefore, the wait indication may also be referred to as two-step indication information.

The third time-frequency resource may be a time-frequency resource that is on an unlicensed spectrum and that is obtained by the second device through LBT, in other words, COT obtained by the second device through LBT.

In a possible implementation, the wait indication may be indicated by using a newly added field. For example, if the first scheduling information is downlink DCI for scheduling PDSCH data, a field "two-step-feedback-indicator" may be newly added to the downlink DCI. Assuming that the field "two-step-feedback-indicator" is a 1-bit indication field, a definition may be that, when a value of the field is 1, it represents that UE further needs to send HARQ information based on another piece of downlink scheduling information.

In a possible implementation, the wait indication may be indicated by setting a value of an existing field to a special value. For example, a value of a field "PDSCH-to-HARQ-_feedback timing indicator" in NR R16 DCI format 1_1 is set to an inapplicable value, to represent that UE needs to send, based on another piece of downlink scheduling information, HARQ feedback information corresponding to a PDSCH.

In a possible implementation, the first scheduling information may further include a sharing indication for indicating that the second device shares, with the first device, the time-frequency resource obtained by the second device, in other words, that the first device may send the HARQ information on the time-frequency resource obtained by the second device through LBT.

It may be understood that although the wait indication indicates the first device to receive the second scheduling information, in other words, indicates the first device to wait for arrival of the second scheduling information, when the second device sends the wait indication, the second device may not know when to send the second scheduling information, in other words, may not know which piece of scheduling information is the second scheduling information, because the second device may not obtain another time-frequency resource through contending, in other words, may not generate the second scheduling information, in this case. Therefore, the second scheduling information may be understood as scheduling information sent by the first device in the future, or scheduling information that is sent by the first device in the future and that satisfies a preset condition. For example, the preset condition may be that an amount of an idle time-frequency resource in a time-frequency resources indicated by the second scheduling information is greater than an amount of an idle time-frequency resource in the third time-frequency resource. The idle time-frequency resource herein may be understood as a time-frequency resource that can be used by the first device.

S402: The second device sends the second scheduling information, and the first device receives the second scheduling information from the second device, where the second scheduling information includes a fourth time-frequency resource of the second device.

A receiving time point of the second scheduling information may be later than a receiving time point of the first scheduling information, and a time domain position of the fourth time-frequency resource may be after a time domain position of the third time-frequency resource. Optionally, an amount of an idle time-frequency resource in the fourth time-frequency resource is greater than the amount of the idle time-frequency resource in the third time-frequency resource. In other words, the fourth time-frequency resource can better support the first device in sending the HARQ information. The fourth time-frequency resource may be a time-frequency resource that is on an unlicensed spectrum and that is obtained by the second device through LBT, in other words, COT obtained by the second device through LBT.

S403: The first device sends the HARQ information on the fourth time-frequency resource based on the first scheduling information and the second scheduling information.

The first device may determine, based on the wait indication in the first scheduling information, that the HARQ information needs to be sent with reference to the second scheduling information, determine, based on the second scheduling information, a time-frequency resource that is in the fourth time-frequency resource and that may be for a HARQ feedback, and send the HARQ information on the determined time-frequency resource.

In a possible implementation, the second scheduling information may include time information (namely, time domain information of a time-frequency resource for sending the HARQ information) indicating to send the HARQ information and resource indication information (namely, frequency domain information of the time-frequency resource for sending the HARQ information) of a corresponding uplink transmission unit. The first device may determine, based on the time information and the resource indication information, the time-frequency resource that is in the fourth time-frequency resource and that may be for the HARQ feedback.

In a possible implementation, priorities and/or groups of data scheduled by using the first scheduling information and the second scheduling information may be the same. It should be understood that the priority and the group herein may also be equivalently explained mutually. Group information may implicitly indicate priority information, or the priority information may be equivalent to the group information. For details, refer to the foregoing related descriptions. Details are not described herein again. For ease of description, the following uses the priority as an example for description.

For example, scheduling information for scheduling a first PDSCH is first downlink scheduling information, and scheduling information for scheduling a second PDSCH is second downlink scheduling information, where the first downlink scheduling information includes a first priority indicator, and the second downlink scheduling information includes a second priority indicator.

Figure 5A:
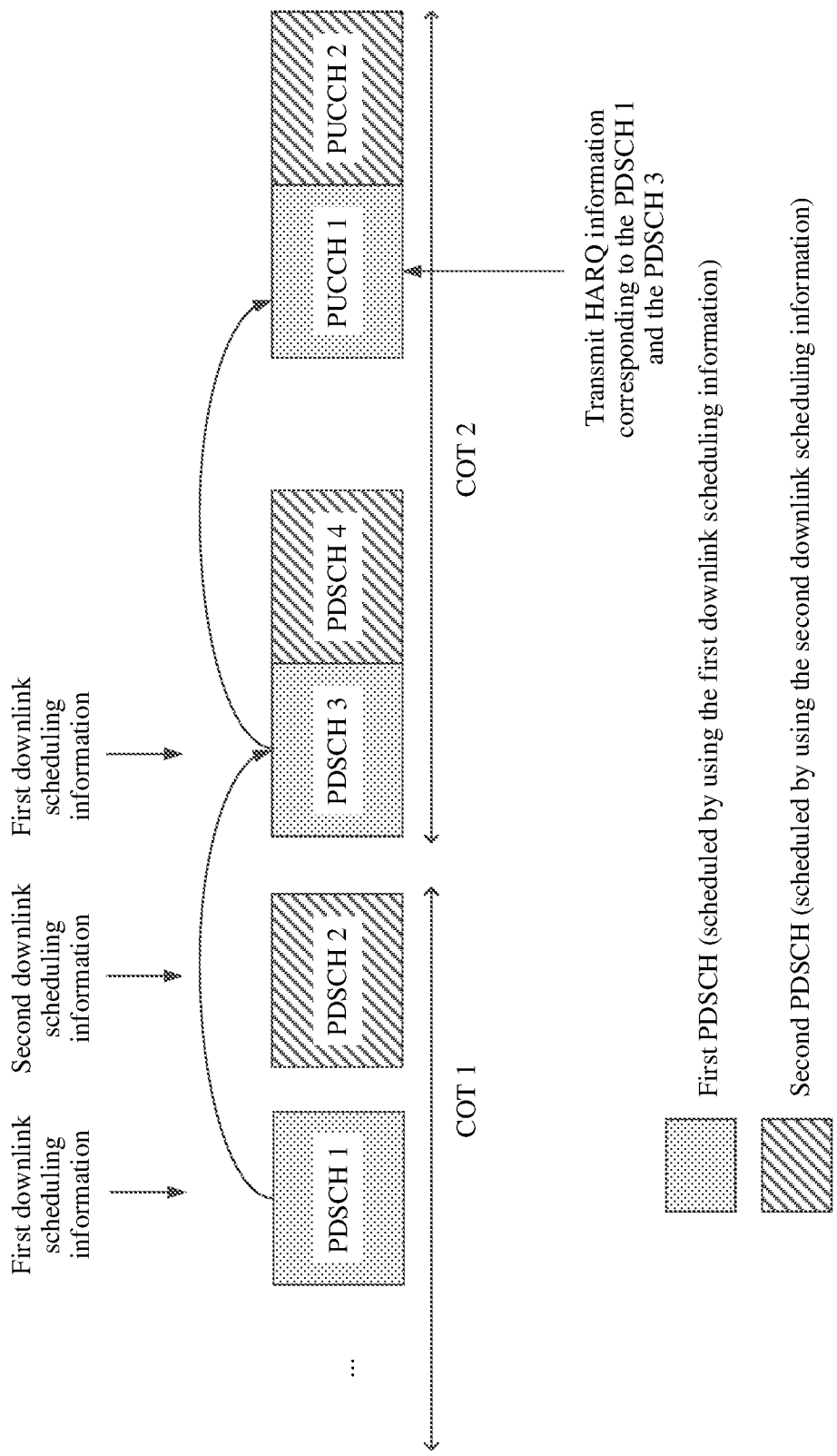
FIG. 5A shows an example of the method shown in FIG. 4.

As shown in FIG. 5A, within COT 1, a base station schedules a first PDSCH 1 by using one piece of first downlink scheduling information and schedules a second PDSCH 2 by using one piece of second downlink scheduling information. Because there is no redundant time within the COT 1 to be shared with the UE, the base station indicates, in a two-step indication manner, the UE to perform a corresponding HARQ feedback.

The first PDSCH 1 is used as an example. Within the COT 1, the base station includes two-step indication information in the first downlink scheduling information, where the two-step indication information indicates to the UE that HARQ information corresponding to the first PDSCH 1 further needs to be sent in combination with another piece of scheduling information. It may be understood that, when receiving the two-step indication information (in the first downlink scheduling information), the UE cannot determine a time point of sending the HARQ information corresponding to the first PDSCH 1 but waits for arrival of another piece of scheduling information. After another piece of scheduling information arrives, the UE can determine the time point of sending the HARQ information and perform a corresponding sending operation. A priority indicated in another piece of scheduling information is equal to a first priority.

For example, for the HARQ information corresponding to the first PDSCH 1, another piece of scheduling information that the first device waits for may be another piece of first downlink scheduling information. That is, another piece of downlink scheduling information includes the same priority indicator (namely, the first priority indicator). As shown in FIG. 5A, another piece of first downlink scheduling information arrives within COT 2, and another piece of first downlink scheduling information is for scheduling a first PDSCH 3.

After receiving another piece of first downlink scheduling information, the first device sends the HARQ information on a time-frequency resource that is for sending the HARQ information and that is indicated in another piece of first downlink scheduling information. As shown in FIG. 5A, for the time-frequency resource that is for sending the HARQ information and that is indicated in another piece of first downlink scheduling information, a frequency domain position is a PUCCH 1, and a time domain position is a period of time within the COT 2.

It should be understood that, in FIG. 5A, an example in which the HARQ information corresponding to the first PDSCH 1 and HARQ information corresponding to the first PDSCH 3 are combined and sent on the PUCCH 1 is used. In addition, the HARQ information corresponding to the first PDSCH 3 may alternatively be discarded, and only the HARQ information corresponding to the first PDSCH 1 is sent. This is not limited herein.

In another possible implementation, priorities and/or groups of data scheduled by using the first scheduling information and the second scheduling information are different.

For example, scheduling information for scheduling a first PDSCH is first downlink scheduling information, scheduling information for scheduling a second PDSCH is second downlink scheduling information, and scheduling information for scheduling a third PDSCH is third downlink scheduling information, where the first downlink scheduling information includes a first priority indicator, the second downlink scheduling information includes a second priority indicator, and the third downlink scheduling information includes a third priority indicator.

Figure 5B:
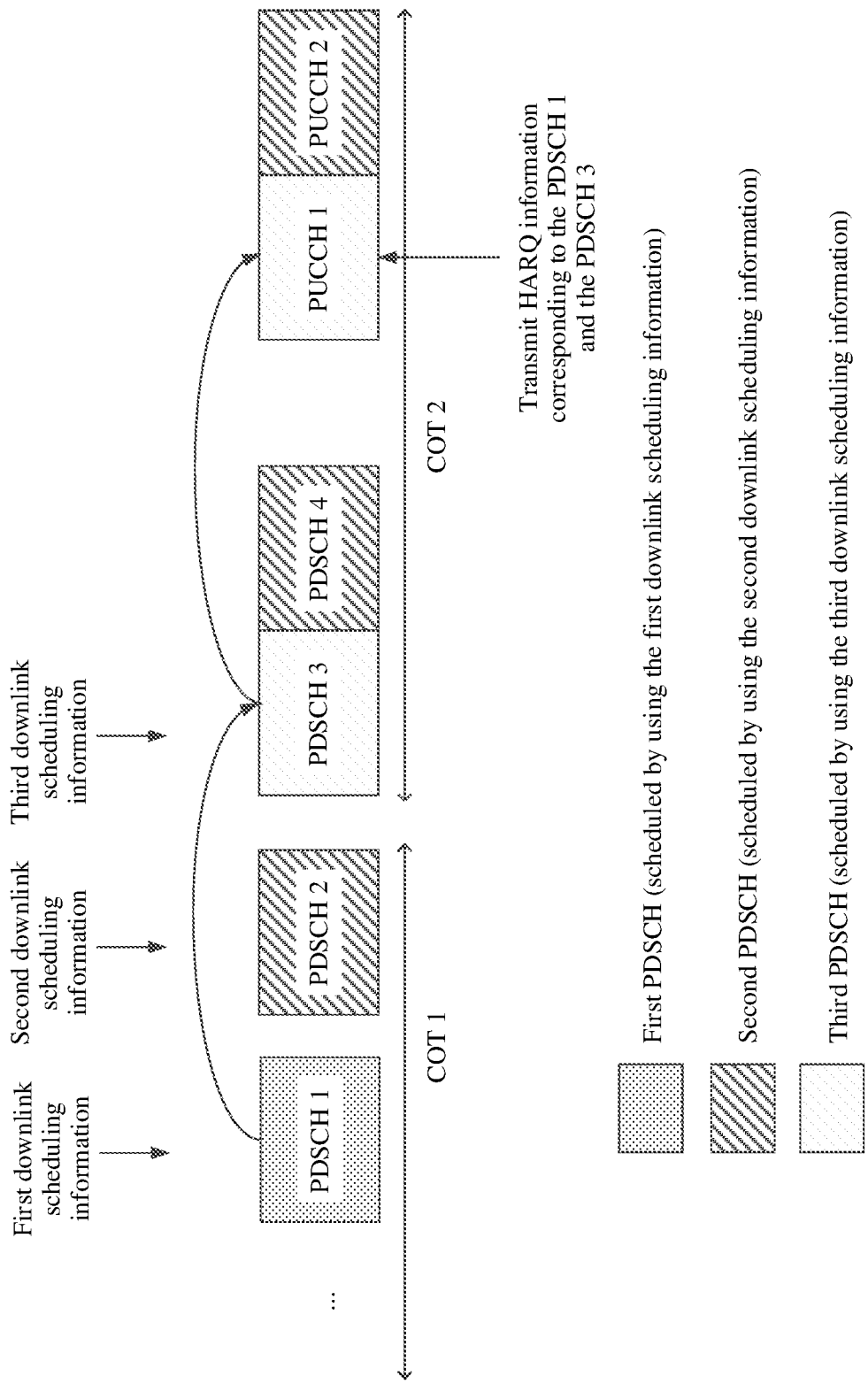
FIG. 5B shows another example of the method shown in FIG. 4.

As shown in FIG. 5B, within COT 1, a base station schedules a first PDSCH 1 by using one piece of first downlink scheduling information and schedules a second PDSCH 2 by using one piece of second downlink scheduling information. Because there is no redundant time within the COT 1 to be shared with the UE, the base station indicates, in a two-step indication manner, the UE to perform a corresponding HARQ feedback.

The first PDSCH 1 is used as an example. Within the COT 1, the base station includes two-step indication information in the first downlink scheduling information, where the two-step indication information indicates to the UE that HARQ information corresponding to the first PDSCH 1 further needs to be sent in combination with another piece of scheduling information. It may be understood that, when receiving the two-step indication information (in the first downlink scheduling information), the UE cannot determine a time point of sending the HARQ information corresponding to the first PDSCH 1 but waits for arrival of another piece of scheduling information. After another piece of scheduling information arrives, the UE can determine the time point of sending the HARQ information and perform a corresponding sending operation. Optionally, a priority indicated in another piece of scheduling information is higher than a first priority, or optionally, a priority indicated in another piece of scheduling information is lower than a first priority.

For example, for the HARQ information corresponding to the first PDSCH 1, another piece of scheduling information that the first device waits for may be another piece of third downlink scheduling information. That is, another piece of downlink scheduling information includes the third priority indicator. As shown in FIG. 5B, another piece of third downlink scheduling information arrives within COT 2, and another piece of third downlink scheduling information is for scheduling a third PDSCH 3.

After receiving another piece of third downlink scheduling information, the first device sends the HARQ information on a time-frequency resource that is for sending the HARQ information and that is indicated in another piece of third downlink scheduling information. As shown in FIG. 5B, for the time-frequency resource that is for sending the HARQ information and that is indicated in another piece of third downlink scheduling information, a frequency domain position is a PUCCH 1, and a time domain position is a period of time within the COT 2.

It should be understood that, in FIG. 5B, an example in which the HARQ information corresponding to the first PDSCH 1 and HARQ information corresponding to the third PDSCH 3 are combined and sent on the PUCCH 1 is used. In addition, the HARQ information corresponding to the third PDSCH 3 may alternatively be discarded, and only the HARQ information corresponding to the first PDSCH 1 is sent. This is not limited herein.

It should be understood that, in this embodiment, scheduling information may be for scheduling first data. Therefore, there may be a correspondence between the first data and any indication information that is included in the scheduling information. Not limited to the first scheduling information or the second scheduling information, each piece of indication information in the scheduling information may be transmitted via DCI and/or RRC signaling.

This embodiment may propose a HARQ information transmission solution that is based on a two-step indication, so that when having no redundant time to share with the first device within currently obtained COT, the second device may indicate, in a two-step indication manner, the first device to wait until next COT (where there is redundant time) of the sending device arrives and then send the HARQ information. This can ensure that the first device sends the HARQ information within time as short as possible, thereby reducing a data processing latency as much as possible, to better support a URLLC scenario.

The methods provided in the embodiments are described above in detail with reference to FIG. 2 to FIG. 5B. Apparatuses provided in embodiments are described below in detail with reference to FIG. 6 to FIG. 8.

Based on this concept, an embodiment may provide a HARQ information transmission apparatus 600. The apparatus 600 may be a network device or may be a terminal device. The apparatus 600 includes modules configured to perform the method shown in FIG. 2. For example, refer to FIG. 6. The apparatus 600 includes:

a processing module 601, configured to generate first HARQ information corresponding to first data, where the first HARQ information corresponds to a first time-frequency resource; and a sending module 602, configured to send the first HARQ information on a second time-frequency resource, where the second time-frequency resource is a time-frequency resource for transmitting second HARQ information corresponding to second data, a time domain position of the second time-frequency resource is after a time domain position of the first time-frequency resource, and the first data and the second data are data with different priorities and/or in different groups.

Optionally, the apparatus further includes a receiving module 603, configured to receive indication information from a second device, where the sending module 602 is configured to send the first HARQ information on the second time-frequency resource based on the indication information.

Figure 6:
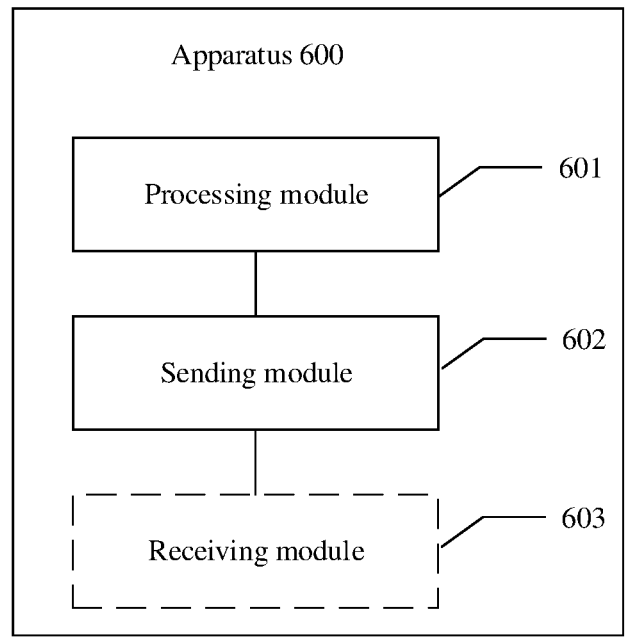
FIG. 6 is a schematic diagram of a structure of a HARQ information transmission apparatus 600 according to an embodiment.

It should be understood that a dashed box in FIG. 6 is for representing that the receiving module 603 is optional for the apparatus 600.

Optionally, the indication information includes first indication information, and the first indication information indicates the apparatus to combine and send the first HARQ information and other HARQ information.

Optionally, the first indication information includes one or more of the following several items: a value of a priority or a group index of the first data corresponding to the first HARQ information; a quantity of priorities or group indexes of data corresponding to HARQ information that needs to be combined and sent; a value of a priority or a group index of data corresponding to the other HARQ information; first trigger information indicating whether to combine and send the first HARQ information and the other HARQ information; or bitmap information indicating a priority/group index of data corresponding to HARQ information that needs to be combined and sent.

Optionally, the indication information includes second indication information, and the second indication information indicates the apparatus to send the first HARQ information without sending other HARQ information; and the sending module 602 is configured to skip sending the second HARQ information on the second time-frequency resource but send the first HARQ information on the second time-frequency resource.

Optionally, the second indication information includes one or more of the following several items: a value of a priority or a group index of the other HARQ information that is not to be sent; a quantity of priorities or group indexes of data corresponding to the other HARQ information that is not to be sent; second trigger information indicating the apparatus to send the first HARQ information without sending the other HARQ information; or bitmap information indicating a priority or a group index of the other HARQ information that is not to be sent.

Optionally, the sending module 602 is configured to autonomously determine, according to a preset policy, to send the first HARQ information on the second time-frequency resource.

Optionally, the sending module 602 is configured to: combine and send the first HARQ information and the second HARQ information on the second time-frequency resource; or give up sending the second HARQ information on the second time-frequency resource but send the first HARQ information on the second time-frequency resource.

Optionally, the second data satisfies: A priority of the second data is higher than the priority of the first data; a priority of the second data is lower than the priority of the first data; a group index of the second data is greater than the group index of the first data; or a group index of the second data is less than the group index of the first data.

Optionally, the sending module 602 is further configured to send third indication information, where the third indication information indicates whether there is other HARQ information on the second time-frequency resource in addition to the first HARQ information.

Optionally, the first HARQ information and the second HARQ information are HARQ information corresponding to uplink data, and the apparatus is a base station; the first HARQ information and the second HARQ information are HARQ information corresponding to downlink data, and the apparatus is a terminal device; or the first HARQ information and the second HARQ information are HARQ information corresponding to sidelink data, and the apparatus is a device on a sidelink.

Optionally, the first time-frequency resource and the second time-frequency resource are time-frequency resources on an unlicensed spectrum.

An embodiment may provide a HARQ information transmission apparatus 700. The apparatus 700 may be a network device or may be a terminal device. The apparatus 700 includes modules configured to perform the method shown in FIG. 4.

Figure 7:
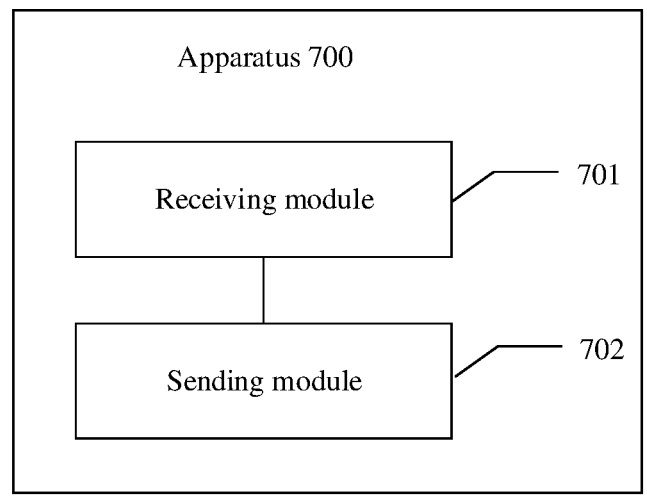
FIG. 7 is a schematic diagram of a structure of a HARQ information transmission apparatus 700 according to an embodiment.

For example, refer to FIG. 7. The apparatus 700 includes:

a receiving module 701, configured to: receive first scheduling information from a second device, where the first scheduling information includes a third time-frequency resource of the second device and a wait indication, and the wait indication indicates the apparatus to receive second scheduling information; and receive the second scheduling information from the second device, where the second scheduling information includes a fourth time-frequency resource of the second device; and a sending module 702, configured to send HARQ information on the fourth time-frequency resource based on the first scheduling information and the second scheduling information.

Optionally, priorities of data scheduled by using the first scheduling information and the second scheduling information are different; and/or groups of data scheduled by using the first scheduling information and the second scheduling information are different.

Optionally, the third time-frequency resource and the fourth time-frequency resource are time-frequency resources that are on an unlicensed spectrum and that are obtained by the second device through listen before talk (LBT).

Figure 8:
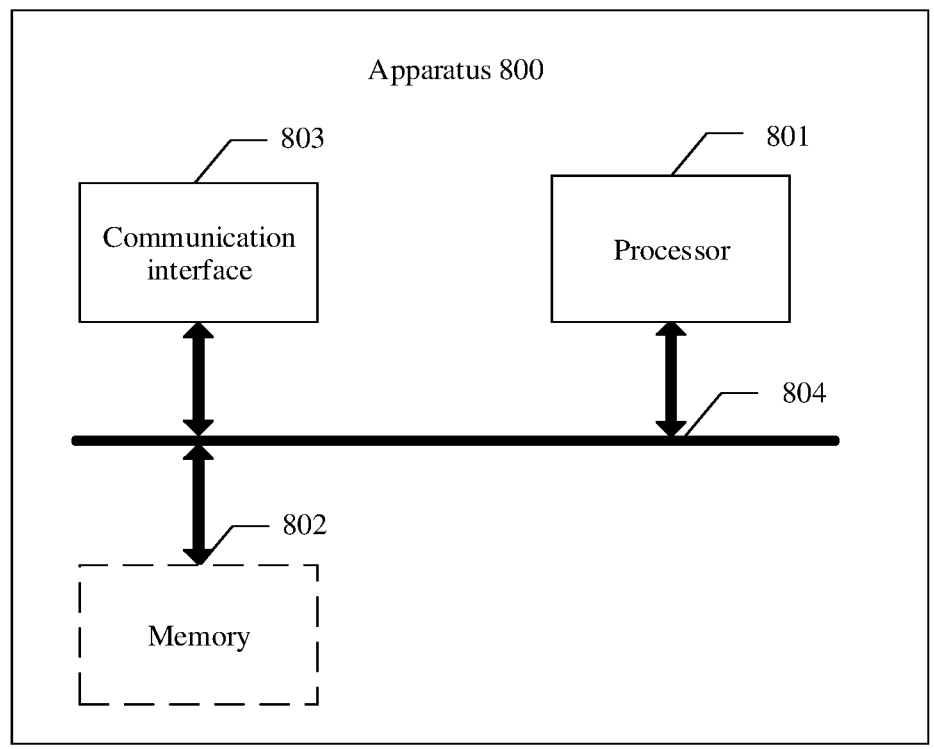
FIG. 8 is a schematic diagram of a structure of a HARQ information transmission apparatus 800 according to an embodiment.

An embodiment may further provide a HARQ information transmission apparatus 800. The apparatus 800 may be a terminal device or may be a network device. As shown in FIG. 8, the apparatus 800 includes:

at least one processor 801; and a memory 802 and a communication interface 803 that are in communication connection with the at least one processor 801, where the memory 802 stores instructions that can be executed by the at least one processor 801, and the at least one processor 801 executes the instructions stored in the memory 802, to perform the method shown in FIG. 2.

Optionally, the memory 802 is located outside the apparatus 800.

Optionally, the apparatus 800 includes the memory 802. The memory 802 is connected to the at least one processor 801, and the memory 802 stores the instructions that can be executed by the at least one processor 801. In FIG. 8, a dashed line is for representing that the memory 802 is optional for the apparatus 800.

The processor 801 and the memory 802 may be coupled by using an interface circuit or may be integrated together. This is not limited herein.

A connection medium between the processor 801, the memory 802, and the communication interface 803 is not limited in this embodiment. In this embodiment, the processor 801, the memory 802, and the communication interface 803 are connected through a bus 804 in FIG. 8, and the bus is represented by a thick line in FIG. 8. A manner of a connection between other components is merely schematically described and is not limited thereto. The bus may be classified into an address bus, a data bus, a control bus, and the like. For ease of representation, only one thick line is for representing the bus in FIG. 8, but this does not mean that there is only one bus or only one type of bus.

It should be understood that the processor mentioned in the embodiments may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

For example, the processor may be a central processing unit (CPU), or may be another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in the embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is the general-purpose processor, the DSP, the ASIC, the FPGA, or another programmable logic device, the discrete gate or the transistor logic device, or the discrete hardware component, the memory (a storage module) may be integrated into the processor.

It should be noted that the memory may include but is not limited to these memories and any memory of another appropriate type.

An embodiment may further provide a computer-readable storage medium, including a program or instructions. When the program or the instructions are run on a computer, the method in FIG. 2 or FIG. 4 is enabled to be performed.

An embodiment may further provide a computer program product. When the computer program product runs on a computer, the method in FIG. 2 or FIG. 4 is enabled to be performed.

An embodiment may further provide a chip. The chip is coupled to a memory and is configured to read and execute program instructions stored in the memory, to implement the method in FIG. 2 or FIG. 4.

It should be understood that all related content of the steps in the foregoing method embodiments may be cited in function descriptions of the corresponding functional modules. Details are not described herein again.

Embodiments are described with reference to the flowcharts and/or block diagrams of the method, the device (system), and the computer program product according to the embodiments. It should be understood that computer program instructions may be for implementing each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or the processor of another programmable data processing device generate an apparatus configured to implement a specified function in one or more processes in the flowcharts and/or in one or more blocks in the block diagrams.

All or some of the foregoing embodiments may be implemented by using software, hardware, firmware, or any combination thereof. When software is for implementing the embodiments, all or some of the embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person skilled in the art can make various modifications and variations to the embodiments without departing from their spirit and scope of the embodiments. Modifications and variations of the embodiments fall within the scope of the embodiments and their equivalent technologies.

What is claimed is:

1. A hybrid automatic repeat request (HARQ) information transmission apparatus, comprising:
at least one processor, and
a memory and a communication interface that are in communication connection with the at least one processor, wherein the memory stores instructions that can be executed by the at least one processor, and the at least one processor executes the instructions stored in the memory, to perform:
generating first hybrid automatic repeat request (HARQ) information corresponding to first data, wherein the first HARQ information corresponds to a first time-frequency resource;
receiving indication information from a second device, wherein the indication information comprises:
first indication information that configures the apparatus to combine and send the first HARQ information and other HARQ information, and
second indication information that configures the apparatus to send the first HARQ information without sending other HARQ information; and
sending the first HARQ information on a second time-frequency resource, wherein the second time-frequency resource is a time-frequency resource for transmitting second HARQ information corresponding to second data, a time domain position of the second time-frequency resource is after a time domain position of the first time-frequency resource, the first data and the second data are data with different groups, and groups of data scheduled by using first scheduling information and second scheduling information are different.

2. The hybrid automatic repeat request (HARQ) information transmission apparatus according to claim 1, wherein the apparatus is further configured to perform:
sending the first HARQ information on the second time-frequency resource based on the indication information.

3. The hybrid automatic repeat request (HARQ) information transmission apparatus according to claim 2, wherein the first indication information comprises a group index of the first data corresponding to the first HARQ information.

4. The hybrid automatic repeat request (HARQ) information transmission apparatus according to claim 2, wherein the sending module is further configured to:
skip sending the second HARQ information on the second time-frequency resource but send the first HARQ information on the second time-frequency resource.

5. The hybrid automatic repeat request (HARQ) information transmission apparatus according to claim 4, wherein the second indication information comprises one or more of the following several items:
a value of a priority or a group index of the other HARQ information that is not to be sent;

a quantity of priorities or group indexes of data corresponding to the other HARQ information that is not to be sent; and second trigger information configures the apparatus to send the first HARQ information without sending the other HARQ information; or bitmap information indicating a priority or a group index of the other HARQ information that is not to be sent.

6. The hybrid automatic repeat request (HARQ) information transmission apparatus according to claim 1, wherein the at least one processor executes the instructions stored in the memory, to perform:

autonomously determine, according to a preset policy, to send the first HARQ information on the second time-frequency resource.

7. The hybrid automatic repeat request (HARQ) information transmission apparatus according to claim 6, wherein the at least one processor executes the instructions stored in the memory, to perform:

combining and sending the first HARQ information and the second HARQ information on the second time-frequency resource; or give up sending the second HARQ information on the second time-frequency resource but send the first HARQ information on the second time-frequency resource.

8. The hybrid automatic repeat request (HARQ) information transmission apparatus according to claim 1, wherein the second data satisfies:

a priority of the second data is higher than the priority of the first data;

a priority of the second data is lower than the priority of the first data;

a group index of the second data is greater than the group index of the first data; or a group index of the second data is less than the group index of the first data.

9. The hybrid automatic repeat request (HARQ) information transmission apparatus according to claim 1, wherein the at least one processor executes the instructions stored in the memory, to perform:

sending third indication information, wherein the third indication information indicates whether there is other HARQ information on the second time-frequency resource in addition to the first HARQ information.

10. The hybrid automatic repeat request (HARQ) information transmission apparatus according to claim 2, wherein the first indication information comprises group indexes of data corresponding to HARQ information that needs to be combined and sent.

11. The hybrid automatic repeat request (HARQ) information transmission apparatus according to claim 2, wherein the first indication information comprises first trigger information indicating whether to combine and send the first HARQ information and the other HARQ information.

12. The hybrid automatic repeat request (HARQ) information transmission apparatus according to claim 2, wherein the first indication information comprises bitmap information indicating a group index of data corresponding to HARQ information that needs to be combined and sent.

13. A hybrid automatic repeat request (HARQ) information transmission apparatus, comprising:

at least one processor; and a memory and a communication interface that are in communication connection with the at least one processor, wherein the memory stores instructions that can be executed by the at least one processor, and the at least one processor executes the instructions stored in the memory, to perform:

receiving first scheduling information from a second device, wherein the first scheduling information comprises a third time-frequency resource of the second device and a wait indication, and the wait indication indicates the apparatus to receive second scheduling information; and receive the second scheduling information from the second device and the second scheduling information comprises a fourth time-frequency resource of the second device;

receiving, by the first device, indication information from a second device, wherein the indication information comprises:

first indication information that configures the apparatus to combine and send the first HARQ information and other HARQ information, and second indication information that configures the apparatus to send the first HARQ information without sending other HARQ information; and sending hybrid automatic repeat request (HARQ) information on the fourth time-frequency resource based on the first scheduling information and the second scheduling information, wherein groups of data scheduled by using the first scheduling information and the second scheduling information are different.

14. The hybrid automatic repeat request (HARQ) information transmission apparatus according to claim 11, wherein the third time-frequency resource and the fourth time-frequency resource are time-frequency resources that are on an unlicensed spectrum and that are obtained by the second device through listen before talk (LBT).

15. A hybrid automatic repeat request (HARQ) information transmission method, comprising:

generating, by a first device, first hybrid automatic repeat request (HARQ) information corresponding to first data, wherein the first HARQ information corresponds to a first time-frequency resource;

receiving, by the first device, indication information from a second device, wherein the indication information comprises:

first indication information that configures the apparatus to combine and send the first HARQ information and other HARQ information, and second indication information that configures the apparatus to send the first HARQ information without sending other HARQ information; and sending, by the first device, the first HARQ information on a second time-frequency resource, wherein the second time-frequency resource is a time-frequency resource for transmitting second HARQ information corresponding to second data, a time domain position of the second time-frequency resource is after a time domain position of the first time-frequency resource, the first data and the second data are data with different groups, and groups of data scheduled by using first scheduling information and second scheduling information are different.

16. The hybrid automatic repeat request (HARQ) information transmission method according to claim 15, wherein the method further comprises:

sending, by the first device, the first HARQ information on the second time-frequency resource further comprises:

sending, by the first device, the first HARQ information on the second time-frequency resource based on the indication information.

17. The hybrid automatic repeat request (HARQ) information transmission method according to claim 16, wherein the first indication information comprises one or more of the following several items:
- a value of a priority or a group index of the first data corresponding to the first HARQ information;
- a quantity of priorities or group indexes of data corresponding to HARQ information that needs to be combined and sent;
- a value of a priority or a group index of data corresponding to the other HARQ information;
- first trigger information indicating whether to combine and send the first HARQ information and the other HARQ information; or
- bitmap information indicating a priority/group index of data corresponding to HARQ information that needs to be combined and sent.

18. The hybrid automatic repeat request (HARQ) information transmission method according to claim 16, wherein sending, by the first device, the first HARQ information on the second time-frequency resource further comprises:
- skipping sending, by the first device, the second HARQ information on the second time-frequency resource, but sending the first HARQ information on the second time-frequency resource.

* * * * *